United States Patent
Sharma et al.

(10) Patent No.: US 12,231,767 B2
(45) Date of Patent: Feb. 18, 2025

(54) METHOD AND SYSTEM FOR TUNING A CAMERA IMAGE SIGNAL PROCESSOR FOR COMPUTER VISION TASKS

(71) Applicant: Qualcomm Technologies, Inc., San Diego, CA (US)

(72) Inventors: Avinash Sharma, Verdun (CA); Emmanuel Luc Julien Onzon, Munich (DE); Nicolas Joseph Paul Robidoux, Montreal (CA); Ali Mosleh, Longueuil (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/502,061

(22) Filed: Nov. 5, 2023

(65) Prior Publication Data

US 2024/0163551 A1   May 16, 2024

Related U.S. Application Data

(63) Continuation of application No. 17/677,919, filed on Feb. 22, 2022, now Pat. No. 11,849,212, which is a continuation of application No. 16/893,388, filed on Jun. 4, 2020, now Pat. No. 11,283,991.

(60) Provisional application No. 62/856,806, filed on Jun. 4, 2019.

(51) Int. Cl.
H04N 23/60   (2023.01)

(52) U.S. Cl.
CPC .................. H04N 23/64 (2023.01)

(58) Field of Classification Search
None
See application file for complete search history.

(56) References Cited

U.S. PATENT DOCUMENTS

| | | | |
|---|---|---|---|
| 8,457,391 | B2 | 6/2013 | Al et al. |
| 10,223,772 | B2 | 3/2019 | Onzon et al. |
| 10,573,031 | B2 | 2/2020 | Mailhe et al. |
| 10,646,156 | B1 | 5/2020 | Schnorr |

(Continued)

OTHER PUBLICATIONS

Benhamou E., et al., "A Discrete Version of CMA-ES", 2018, 11 Pages.

(Continued)

Primary Examiner — James M Hannett
(74) Attorney, Agent, or Firm — QUALCOMM Incorporated

(57) ABSTRACT

Image Signal Processing (ISP) optimization framework for computer vision applications is disclosed. The tuning of the ISP is performed automatically and presented as a nonlinear multi-objective optimization problem, followed by solving the problem using an evolutionary stochastic solver. An improved ISP of the embodiments of the invention includes at least features of search space reduction for reducing a number of ISP configurations, remapping the generated population to the reduced search space via mirroring, and global optimization function processing, which allow tuning all the blocks of the ISP at the same time instead of the prior art tuning of each ISP block separately. Also shown that an ISP tuned for image quality performs inferior compared with an ISP trained for a specific downstream image recognition task.

20 Claims, 30 Drawing Sheets
(9 of 30 Drawing Sheet(s) Filed in Color)

(56) References Cited

U.S. PATENT DOCUMENTS

| | | | |
|---|---|---|---|
| 11,283,991 | B2 | 3/2022 | Sharma et al. |
| 11,849,212 | B2 | 12/2023 | Sharma et al. |
| 2019/0043209 | A1* | 2/2019 | Nishimura ............. H04N 5/213 |
| 2019/0171897 | A1 | 6/2019 | Merai et al. |
| 2020/0293828 | A1 | 9/2020 | Wang et al. |

OTHER PUBLICATIONS

Durbin J., "Distribution Theory for Tests Based on the Sample Distribution Function", SIAM, 1973.

Emmerich M.T.M., et al., "A Tutorial on Multiobjective Optimization: Fundamentals and Evolutionary Methods", 17(3), 2018, pp. 585-609.

Hansen N., "Benchmarking a BI-Population CMA-ES on the BBOB-2009 Function Testbed", ACM-GECCO Genetic and Evolutionary Computation Conference (2009), pp. 2389-2395.

Hansen N., et al., "Completely Derandomized Self-Adaptation in Evolution Strategies", Evolutionary Computation 9(2), 2001 by the Massachusetts Institute of Technology, pp. 159-195.

Kim S.J., et al., "A New In-Camera Imaging Model for Color Computer Vision and its Application". IEEE Transactions on Pattern Analysis and Machine Intelligence, vol. 34, No. 12, Dec. 2012, pp. 2289-2302.

Kuiper N.H., "Tests Concerning Random Points on A Circle", vol. 63. No. 1, 1960, pp. 38-47.

Lin T-Y., et al., "Microsoft COCO: Common Objects in Context", European conference on computer vision (ECCV), arXiv:1405.0312v3 [cs.CV], Feb. 21, 2015, pp. 1-15.

McKay M.D., et al., "A Comparison of Three Methods for Selecting Values of Input Variables in the Analysis of Output from a Computer Code", Technometrics, vol. 21, No. 2, May 1979, pp. 239-245.

Nishimura N., et al., "Automatic ISP Image Quality Tuning Using Nonlinear Optimization", IEEE International Conference on Image Processing (ICIP), 2018, pp. 2471-2475.

Plackett R.L., "Karl Pearson and the Chi-Squared Test", International Statistical Review/Revue Internationale de Statistique, 1983, pp. 59-72.

Ren S., et al., "Faster R-CNN: Towards Real-Time Object Detection with Region Proposal Networks", Advances in neural information processing systems (NeurIPS), 2015, pp. 91-99.

Scholz F.W., et al., "K-Sample Anderson-Darling Tests", Journal of the American Statistical Association vol. 82 No. 399, 1987, pp. 918-924.

Slowik A., et al., "Evolutionary Algorithms and their Applications to Engineering Problems", Neural Computing and Applications, 2020, pp. 1-17.

Torsney-Weir T., et al., "Tuner: Principled Parameter Finding for Image Segmentation Algorithms using Visual Response Surface Exploration", IEEE Transactions on Visualization and Computer Graphics vol. 17, No. 12, Dec. 2011, pp. 1892-1901.

* cited by examiner

METHOD AND SYSTEM FOR TUNING A CAMERA IMAGE SIGNAL PROCESSOR FOR COMPUTER VISION TASKS

RELATED APPLICATIONS

The present application is a continuation of the U.S. application Ser. No. 17/677,919 filed on Feb. 22, 2022, which in turn is a continuation of the U.S. application serial number U.S. Ser. No. 16/893,388, filed on Jun. 4, 2020 and now issued as a U.S. Pat. No. 11,283,991 on Mar. 22, 2023, which claims benefit from the US provisional application, serial number U.S. 62/856,806, filed on Jun. 4, 2019, the entire contents of all applications and patents have been incorporated herein by reference.

FIELD OF THE INVENTION

The present invention relates to tuning/optimizing an image signal processor (ISP) of a digital camera, and in particular to a method and system for tuning/optimizing an ISP of a digital camera for computer vision tasks.

BACKGROUND OF THE INVENTION

Considerable advancements in machine learning have become the foundation of modern efficient computer vision systems.

However, the role of the image signal processor (ISP) as an essential part of computer vision systems has been often ignored. As known, an ISP has various image processing blocks that based on ISP parameter configuration, the blocks being used to construct an image from raw sensor data. However, an ISP is often tuned for a human visual system, rather than a target computer vision task.

Computer vision (CV) modules extract information from image data using models constructed with the aid of physics, geometry, statistics, and learning. Such modules are typically designed to operate on input image data generated for optimized human perception. This is arguably due to the fact that image quality data is more readily available for designing test vision systems. Thus, existing imaging pipelines typically produce high-quality images for human perception. Such pipelines have image sensors and image signal processors (ISPs) whose large set of parameters are typically hand-tuned to produce low-noise, high-resolution, sharp, and color-corrected images.

A CV module in a vision system is often treated as an add-on module to an existing imaging pipeline. Vision systems are often used for dual purposes, e.g., visual output and analysis. Hence, imaging pipelines are often only designed for visual tasks under the assumption that this does not affect the CV downstream performance.

Therefore, there is a need in the industry for developing an improved method and system for tuning/optimizing an ISP for various computer vision tasks, which would mitigate or avoid at least some shortcomings of the prior art.

SUMMARY OF THE INVENTION

There is an object of the present invention to provide an improved method and system for tuning a camera ISP for computer vision tasks.

The inventors have recognized that modern CV algorithms do not necessarily require the same level of quality that a human does. Consider a text detection system, for instance, that should perform equally well on both black-and-white text images and beautifully colored image. On the other hand, the parameters of the imaging pipeline tuned based on the image quality (IQ) may result in a low-performance in the CV task. For instance, typically tuned denoising parameters of an ISP would make the output image appear good to a human, while they would cause removal of small objects of interest from that image and consequently make an object detection CV algorithm fail. This is due to the fact that image quality is achieved based on perceptual metrics that may not be optimal for computer vision applications.

In the present application, we propose an optimization framework to achieve an adaptation of the ISP output to CV applications via automating the tuning process of a given ISP.

We formulate the process of ISP tuning as a multi-objective optimization problem. Then, we apply evolutionary algorithms to approach the multi-objective optimization problem of automatic ISP tuning. We consider the ISP tuning as a black-box optimization problem whose global optima is found stochastically using a covariance matrix adaptation evolution strategy (CMA-ES) for multiple CV performance metrics. The proposed optimization framework generates a set of solutions that takes best compromises, i.e., Pareto front, among multiple metrics. We use our framework to examine various vision applications, including both classic CV methods and methods based on convolutional neural networks (CNNs), and tune simulated and real ISPs.

The proposed framework eliminates the use of subjective and manual adjustments, and accelerates ISP tuning to produce much better CV results. Moreover, the proposed optimization framework using a relatively small tuning set, may be an alternative to the cumbersome process of collecting a large amount of data and re-training CV algorithms once used with a specific ISP.

According to one aspect of the invention, there is provided a method for tuning an image signal processor (ISP) of a digital camera having configuration parameters, the method comprising employing at least one hardware processor for: (a) capturing a raw image, (b) processing the raw image by the ISP with the configuration parameters to generate a processed image, (c) supplying the processed image to a computer vision (CV) system, (d) measuring a performance of the CV system with regard to a target CV task, (e) tuning the configuration parameters of the ISP based on the measured performance of the CV system, and (f) repeating the steps (b)-(e) using the configuration parameters from the step (e) until a required measure of performance of the CV system is achieved, thereby improving the performance of the CV system for the target CV task.

The step (e) further comprises (i) building a multi-objective loss function with regard to the measure of performance, and (ii) applying an evolutionary algorithm, having a number of trials (population), to the multi-objective loss function to determine the configuration parameters of the ISP as tuned in the step (e), thereby performing a global optimization of at least two or more modules of the ISP simultaneously.

The (ii) step further comprises remapping the population which falls outside of search bounds for the configuration parameters back to the search bounds using a mirroring based remapping technique. The at least two or more modules of the ISP comprise at least two or more of the following: denoising, demosaicking, white balancing, color correction, tone mapping, image sharpening, JPEG compression.

The step (e) further comprises reducing a number of combinations of the configuration parameters of the ISP (ISP sets), comprising (i) sampling a Latin Hyper-Cube space with regard to the configuration parameters of the ISP, (ii) measuring the performance of the CV system for the ISP sets sampled in the step (j), and (iii) selecting ranges for configuration parameters based on those ISP sets which result in the measure of performance of the CV system above a predetermined threshold.

The step (e) further comprises modifying a search space for the configuration parameters, comprising for each configuration parameter: (i) for a loss for a respective KPI, computing a weight from a p-value of a statistical test chosen so that the p-value is inversely correlated with an impact of said each configuration parameter on the loss, (ii) scalarizing weighted losses of all KPIs to obtain a single loss, (iii) determining a modified search range containing those trials which have lowest scalarized loss values, and determining a modified search space comprising aggregating modified search ranges across all configuration parameters.

The step (e) further comprises initializing an initial set of estimates of the configuration parameters, comprising retrieving an initial set of trials (population), for at least some of the trials of the initial set of trials, ranking key performance indicator (KPI) values, indicating the performance of the CV system, determining those configuration parameters which correspond to top ranked KPI values, and determining the initial set of estimates as said those configuration parameters corresponding to the top ranked KPI values. The ranking comprises a multi-objective ranking using a scalarization method, wherein the multi-objective ranking comprises using a weighted max-rank method. The tuning comprises tuning at least two or more modules of the ISP at the same time.

The step (e) further comprises remapping an initial number of trials (population) of configuration parameters which falls outside a search space for the configuration parameters, back onto the search space. The step (a) comprises one of the following: capturing the raw image by digital camera, computer simulating the raw image.

According to another aspect of the invention, there is provided an apparatus for tuning an image signal processor (ISP) of a digital camera having configuration parameters, comprising a memory device having computer readable instructions stored thereon for execution by a processor, causing the processor to: (a) capture a raw image, (b) process the raw image with the ISP with the configuration parameters to generate a processed image, (c) supply the processed image to a computer vision (CV) system, (d) measure a performance of the CV system with regard to a target CV task, (e) tune the configuration parameters of the ISP based on the measured performance of the CV system, and (f) repeat the steps (b)-(e) using the configuration parameters from the step (e) until a required measure of performance of the CV system is achieved, thereby improving the performance of the CV system for the target CV task.

The computer readable instructions causing to tune further comprise computer readable instruction causing the processor to: (i) build a multi-objective loss function with regard to the measure of performance, and (ii) apply an evolutionary algorithm, having a number of trials (population), to the multi-objective loss function to determine the configuration parameters of the ISP as tuned in the step (e), thereby performing a global optimization of two or more features of the ISP simultaneously.

The computer readable instructions causing to tune further comprise computer readable instruction causing the processor to remap the population which falls outside of search bounds for the configuration parameters back to the search bounds using a mirroring based remapping technique. The two or more features of the ISP comprise two or more of the following: denoising, demosaicking, white balancing, color correction, one mapping, image sharpening, JPEG compression.

The computer readable instructions causing to tune further comprises computer readable instructions causing to reduce a number of combinations of the configuration parameters of the ISP (ISP sets), comprising: (i) sampling a Latin Hyper-Cube space with regard to the configuration parameters of the ISP, (ii) measuring the performance of the CV system for the ISP sets sampled in the step (i), and (iii) selecting ranges for configuration parameters based on those ISP sets which result in the measure of performance of the CV system above a predetermined threshold.

The computer readable instructions causing to tune further comprise computer readable instruction causing the processor to modify a search space for the configuration parameters, comprising for each configuration parameter: (i) for a loss for a respective KPI, computing a weight from a p-value of a statistical test chosen so that the p-value is inversely correlated with an impact of said each configuration parameter on the loss, (ii) scalarizing weighted losses of all KPIs to obtain a single loss, (iii) determining a modified search range containing those trials which have lowest scalarized loss values, and determine a modified search space comprising aggregating modified search ranges across all configuration parameters.

The computer readable instructions causing to tune further comprise computer readable instruction causing the processor to: initialize an initial set of estimates of the configuration parameters, comprising: retrieving an initial set of trials (population), for at least some of the trials of the initial set of trials, ranking key performance indicator (KPI) values, indicating the performance of the CV system, determining those configuration parameters which correspond to top ranked KPI values, and determining the initial set of estimates as said those configuration parameters corresponding to the top ranked KPI values.

The computer readable instructions causing the ranking further causing multi-objective ranking using a scalarization ranking, wherein the multi-objective ranking comprises a weighted max-rank ranking.

The computer readable instructions causing to tune further comprise computer readable instruction causing the processor to tune at least two or more modules of the ISP at the same time.

The computer readable instructions causing to tune further comprise computer readable instructions causing the processor to remap an initial number of trials (population) of configuration parameters which falls outside a search space for the configuration parameters, back onto the search space.

The computer readable instructions causing to capture further comprise computer readable instruction causing the processor to capture the raw image by digital camera, computer simulate the raw image.

According to yet another aspect of the invention, there is provided a computer vision system, comprising means for obtaining a raw image, an image signal processor (ISP) having configuration parameters for processing the raw image, an apparatus for tuning the image signal processor, comprising a processor, and a memory device having computer readable instructions stored thereon for execution by the processor, causing the processor to: (a) process the raw image with the ISP with the configuration parameters to generate a processed image, (b) supply the processed image to a computer vision (CV) system, (c) measure a performance of the CV system with regard to a target CV task, (d) tune the configuration parameters of the ISP based on the measured performance of the CV system, and (e) repeat the steps (c)-(d) using the configuration parameters from the step (d) until a required measure of performance of the CV system is achieved, thereby improving the performance of the CV system for the target CV task.

According to yet another aspect of the invention, there is provided a network comprising one or more nodes communicating over the network, at least one of said one or more nodes comprising a computer vision system, comprising means for obtaining a raw image, an image signal processor (ISP) having configuration parameters for processing the raw image, an apparatus for tuning the image signal processor, comprising a processor, and a memory device having computer readable instructions stored thereon for execution by the processor, causing the processor to: (a) process the raw image by the ISP with the configuration parameters to generate a processed image, (b) supply the processed image to a computer vision (CV) system, (c) measure a performance of the CV system with regard to a target CV task, (d) tune the configuration parameters of the ISP based on the measured performance of the CV system, and (e) repeat the steps (c)-(d) using the configuration parameters from the step (d) until a required measure of performance of the CV system is achieved, thereby improving the performance of the CV system for the target CV task.

The step (e) further comprises modifying a search space for the configuration parameters, comprising for each configuration parameter: (i) applying a hypothesis test against each key performance indicator (KPI) indicating the performance of the CV system, the hypothesis test indicating a dependency of a loss for said each KPI, (ii) determining weighted losses and scalarizing the weighted losses for said each KPI, (iii) determining a modified range corresponding to those trials which have best scalarized loss values, and determining a modified search space based on respective modified ranges.

The determining weighted losses comprises for each configuration parameter and KPI with nontrivial dependency, weighting a loss corresponding to a KPI with a value derived from a p-value of a test of significance, to produce one weight per configuration parameter-KPI pair.

The scalarizing comprises assembling the weighted losses into a single scalar loss for use in a single objective with weights corresponding to p-values of Kolmogorov-Smirnov test below a threshold $p_{threshold}$.

The step (e) further comprises modifying a search space for the configuration parameters, comprising for each configuration parameter: (i) setting the loss weight to zero for a KPI for which all the trials pass a stringent acceptability threshold thus indicating strong independence of the loss on the parameter value, and otherwise (ii) computing the loss weight from the p-value of a two sample distribution comparison test quantifying the difference between the distribution of the values of the parameter for the trials with better ranked loss values and the distribution of the values of the parameter for the trials with worst ranked loss values, (iii) determining weighted losses and scalarizing (combining into one single aggregate loss) the weighted losses of all KPIs, (iv) determining a modified range corresponding to those trials with the best (lowest) scalarized loss values, and (v) determining a modified search space based on respective modified ranges.

The determining weighted losses comprises for each configuration parameter and KPI with nontrivial dependency as determined by setting the loss weight to zero, weighting the loss corresponding to a KPI with a value derived from the p-value of a comparison test between the distributions of better ranked and worst ranked values of the corresponding loss, to produce one weight per configuration parameter-KPI pair.

The scalarizing comprises assembling the weighted losses into a single scalar loss for use as a single objective with weights derived from the p-values of a Kolmogorov-Smirnov or other two sample distribution comparison test by taking, for each trial, the maximum of the product of the weight and the rank of the loss over all the loss values attained within the population, thus obtaining the weighted max-rank loss for each trial.

The computer readable instructions causing to tune further comprise computer readable instruction causing the processor to modify a search space for the configuration parameters, comprising for each configuration parameter: (i) apply a hypothesis test against each key performance indicator (KPI) indicating the performance of the CV system, the hypothesis test indicating a dependency of a loss for said each KPI, (ii) determine weighted losses and scalarize the weighted losses for said each KPI, (iii) determine a modified range corresponding to those trials which have best scalarized loss values, and determine a modified search space based on respective modified ranges.

The computer readable instructions causing to determine weighted losses further comprise computer readable instruction causing the processor to for each configuration parameter and KPI with nontrivial dependency, weigh a loss corresponding to a KPI with a value derived from a p-value of a test of significance, to produce one weight per configuration parameter-KPI pair.

The computer readable instructions causing to scalarize the weighted losses further comprise computer readable instruction causing the processor to assemble the weighted losses into a single scalar loss for use in a single objective with weights corresponding to p-values of Kolmogorov-Smirnov test below a threshold $p_{threshold}$.

The computer readable instructions causing to tune further comprise computer readable instruction causing the processor to modify a search space for the configuration parameters, comprising for each configuration parameter: (i) setting the loss weight to zero for a KPI for which all the trials pass a stringent acceptability threshold thus indicating strong independence of the loss on the parameter value, and otherwise (ii) computing the loss weight from the p-value of a two sample distribution comparison test quantifying the difference between the distribution of the values of the parameter for the trials with better ranked loss values and the distribution of the values of the parameter for the trials with worst ranked loss values, (iii) determining weighted losses and scalarizing (combining into one single aggregate loss) the weighted losses of all KPIs, (iv) determining a modified range corresponding to those trials with the best (lowest) scalarized loss values, and determining a modified search space based on respective modified ranges.

The computer readable instructions causing to determine weighted losses further comprise computer readable instruction causing the processor to for each configuration parameter and KPI with nontrivial dependency as determined by setting the loss weight to zero, weighting the loss corresponding to a KPI with a value derived from the p-value of a comparison test between the distributions of better ranked and worst ranked values of the corresponding loss, to produce one weight per configuration parameter-KPI pair.

The computer readable instructions causing to scalarize comprise computer readable instruction causing the processor to assemble the weighted losses into a single scalar loss for use as a single objective with weights derived from the p-values of a Kolmogorov-Smirnov or other two sample distribution comparison test by taking, for each trial, the maximum of the product of the weight and the rank of the loss over all the loss values attained within the population, thus obtaining the weighted max-rank loss for each trial.

Thus, an improved method and system for tuning a camera ISP for computer vision tasks have been provided.

BRIEF DESCRIPTION OF THE DRAWINGS

The patent or application file contains at least one drawing executed in color. Copies of this patent application publication with color drawing(s) will be provided by the Office upon request and payment of the necessary fee.

For better understanding of the embodiments and/or related implementations described herein and to show more clearly how they may be carried into effect, reference will now be made, by way of example only, to the accompanying drawings which show at least one exemplary embodiment and/or related implementation in which:

FIGS. 8A, 8B and 8C illustrate results of ISP optimization with real raw data for Faster-RCNN for a night time street scene object detection, for default ISP, IQ-tuned ISP, and CV-tuned ISP of the embodiment of the invention respectively;

DESCRIPTION OF EMBODIMENTS OF THE INVENTION

Figure 2:
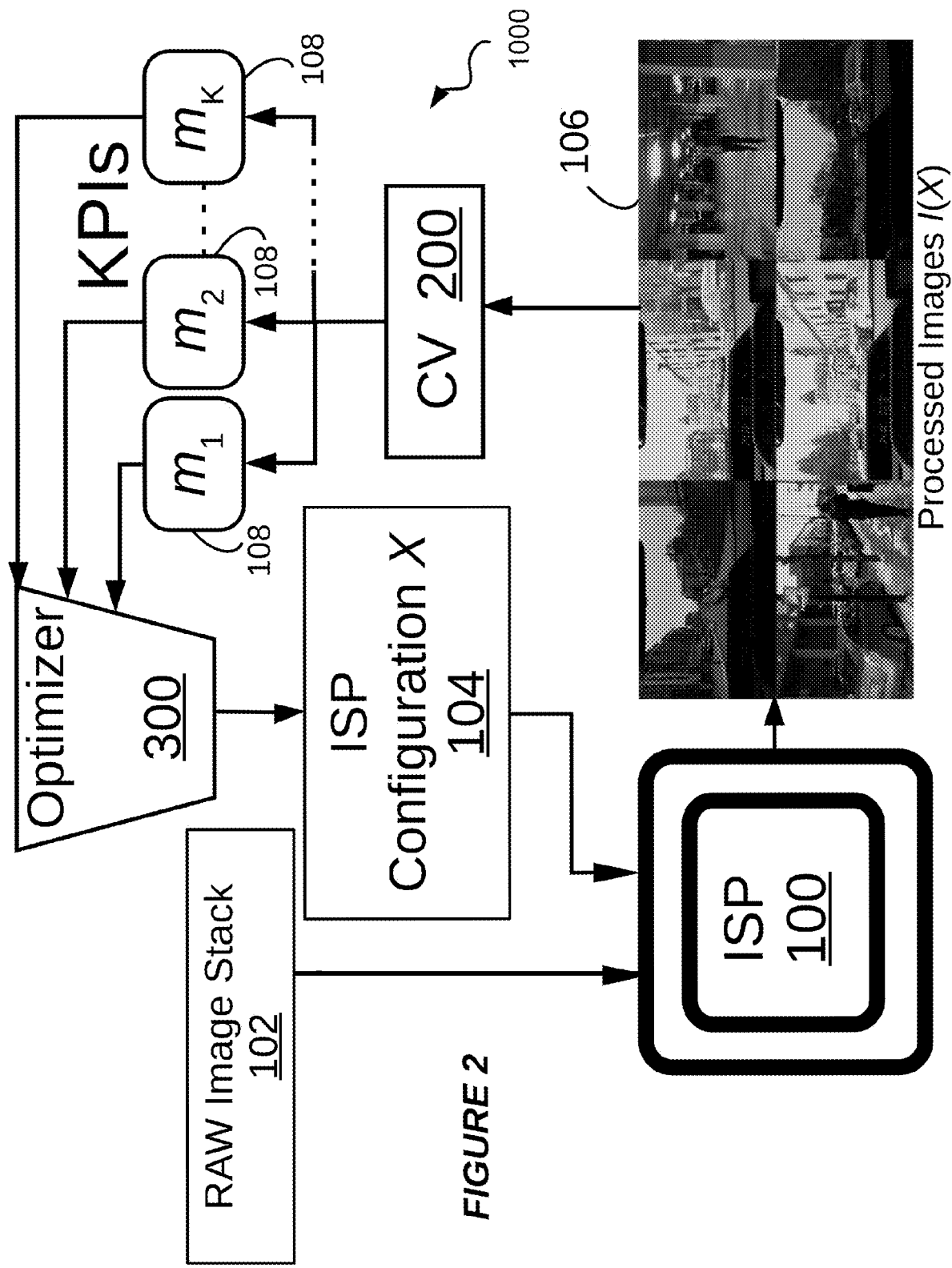
FIG. 2 illustrates a system for tuning an ISP according to embodiments of the invention.

A system 1000 for tuning a camera ISP of the embodiments of the invention is illustrated in FIG. 2, which includes among other modules, an ISP 100, a computer vision (CV) detection module 200, and an optimizer module 300.

The main focus of the optimization process in this patent application is on the parameters of various processing blocks of the ISP 100 as illustrated in FIG. 2. Parameter optimization for manufacturing of optics and sensor hardware is outside of this patent application.

ISP Configuration 104. The ISP 100 may include different components/modules performing different functions. Each component/module is responsible for a specific process to generate a final image. Typical modules of an ISP are a denoiser, demosaicker, white-balancer, color corrector, tone mapper, and JPEG compressor that are functions of some input parameters along with the image. We refer to such set of parameters as ISP configuration 104, or ISP configuration set X 104. The goal of the proposed optimization framework is to find an ISP configuration 104 that would result in a maximum performance for one or more target CV application or applications. The ISP configuration set X 104 is composed of L number of ISP parameters represented by $$X=[x_1,x_2,\ldots x_L], \quad (1)$$

where each ISP parameter $x_l$ is bounded within a lower and higher value as z $$x_l \in [x_l^{low}, x_l^{high}], \forall l \in [1,L] \quad (2)$$

ISP parameters are generally discrete or categorical but we map them to the continuous space in this formulation.

Raw Image Stack 102. The optimization process of the ISP 100 requires a set of images captured and processed using the same imaging pipeline. Since the lens system and sensor are not part of the tuning procedure, a set of images 102 captured with the sensor but not pushed through the ISP are collected and used. This set is in fact a stack of N sensor raw images 102, properly tagged/annotated with respect to the target CV task or tasks. The raw images 102 are processed by the ISP 100 for all evaluated ISP configurations 104 during the tuning process. This raw image stack 102 is denoted by $$I(X)=[I_1(X), I_2(X), \ldots, I_N(X)]. \quad (3)$$

To benefit from the large amount of annotated data available for evaluation of various CV applications, the aforementioned RAW images can be generated via RAW image simulation using existing sensor simulation methods as described in "S. J. Kim, H. T. Lin, Z. Lu, S. Susstrunk, S. Lin, and M. S. Brown. A new in-camera imaging model for color computer vision and its application. IEEE Transaction on Pattern Analysis and Machine Intelligence, 34 (12):2289-2302, 2012."

Computer Vision Module 200. The raw image stack 102 processed by the ISP 100 is passed through the CV module 200. The CV module 200 performs the ultimate task or tasks that the entire imaging pipeline and the vision system are designed for. Examples of such tasks can be face, object, text, etc. detection/recognition, human gait analysis, augmented reality, or image retrieval. CV modules are typically pre-trained or derived from some kind of generalized statistics and cannot be easily modified, tuned, and/or re-trained. The CV module 200 that takes the ISP processed images 106 as inputs is denoted by CV(I(x)).

Measure of Performance of the CV system. The results of the CV task are passed through evaluation metrics, i.e., key performance indicators (KPIs) $m_k$ 108 are measures of performance of the CV 200, and are defined as $$m_k[x]=KPI_k(CV(I(X))). \quad (4)$$

Since the CV output can be evaluated using more than one KPI, output of each KPI is indexed as $m_k$ ($\forall k \in [1, K]$) in Eq. (4). For instance, in case of object detection, common KPIs include Accuracy, Precision, Recall, Mean-Average-Precision (MAP), Mean-Average-Recall (MAR), Panoptic Quality (PQ) in case of segmentation, or peak signal-to-noise ratio (PSNR) and structural similarity index (SSIM).

The expected and acceptable lower-bound ($m_k^{low}$) and upper-bound ($m_k^{high}$) of the range of the KPI target needs to be defined in the tuning process as $$m_k^{Target}: m_k \in [m_k^{low}, m_k^{high}]. \quad (5)$$

The choice of this range depends on what we expect from an ISP. For example, for a mid-end ISP, a PSNR range i.e., $m_1 \in [15, 30]$ would be a reasonable choice.

Metric-Target Loss Function Formulation. The goal of the proposed system 1000 for tuning the ISP 100 is to find ISP parameters (and hence a particular configuration or configurations 104) that would bring all the CV KPIs $m_k$ 108 to near the KPI target ranges [$m_k^{low}$, $m_k^{high}$]. This may be formulated in the form of a loss function as $$f(m_k; X) = \begin{cases} w_k |m_k^{high} - m_k[X]|^{n_k} & \text{if } m_k[X] > m_k^{high} \\ w_k |m_k[X] - m_k^{low}|^{n_k} & \text{if } m_k[X] < m_k^{low}, \\ 0 & \text{else} \end{cases} \quad (6)$$

where $w_k$ and $n_k$ denote a scalar weight, and an exponent associated to the metric $m_k$, respectively. With a loss function, a lower value indicates a better result.

We use multiple metrics for the CV task to evaluate it in the ISP tuning.

Hence, the overall goal can be seen as optimizing a multi-objective problem formulated as $$\text{minimize}_X(f(m_1;X), \ldots, f(m_K;X)), s.t. x_l \in [x_l^{low}, x_l^{high}], \forall l \in [1,L]. \quad (7)$$

For example, a camera ISP may have multiple parameters (for example tens of parameters) often not orthogonal with regard to each other. Also, operations performed inside an ISP 100 are not necessarily linear and may not follow a differentiable functionality. Therefore, the optimization problem (7) is generally non-linear and lacks close-form gradients. Additionally, except for some range of ISP parameters, the ISP operations themselves are not entirely known to a user who tries to solve a problem a black-box optimization. Such specifications of the ISP tuning problem and the foreseeable rugged search landscape (e.g., local optima, outliers, discontinuities, sharp bends, noise) make applications of quasi-Newton or conjugate gradient category of approaches, unusable in solving optimization problem (7).

ISP Optimization Framework for CV (System 1000)

FIG. 2 presents an overview of the ISP optimization framework (system 1000) of the embodiments of the invention for tuning the ISP 100 for an arbitrary CV task. It begins with a set of raw images 102 fed to the ISP 100, and the processed images 106 after the ISP 100 are fed to the CV module 200.

The performance of the CV task is measured given the ISP processed images 106 and provided to an optimizer 300. The optimizer 300 iteratively improves the ISP parameters 104 given the measured CV performance, for example the KPIs $m_k$ 108.

Figure 3:
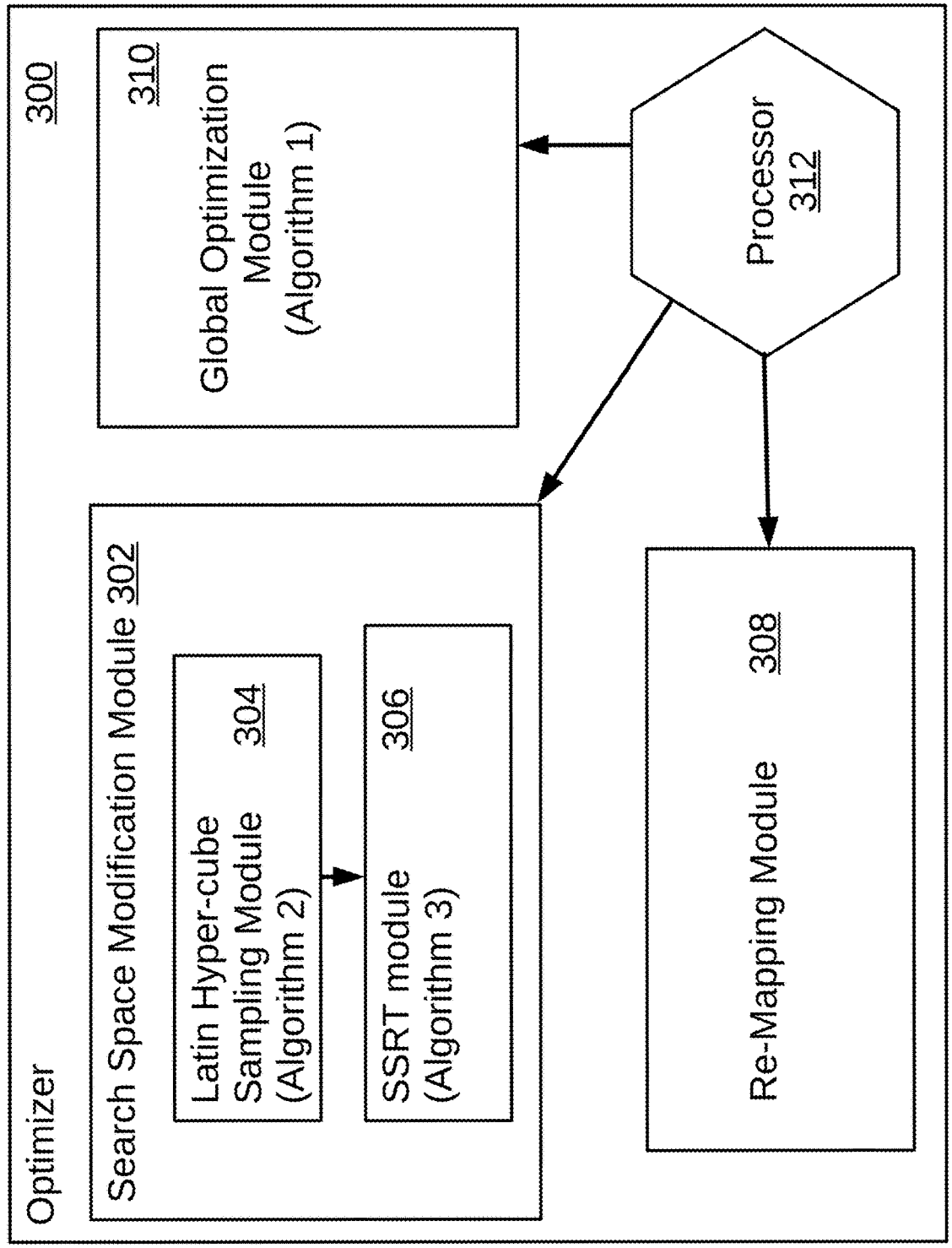
FIG. 3 shows the Optimizer module 300 of FIG. 2 in more detail.
Figure 3A:
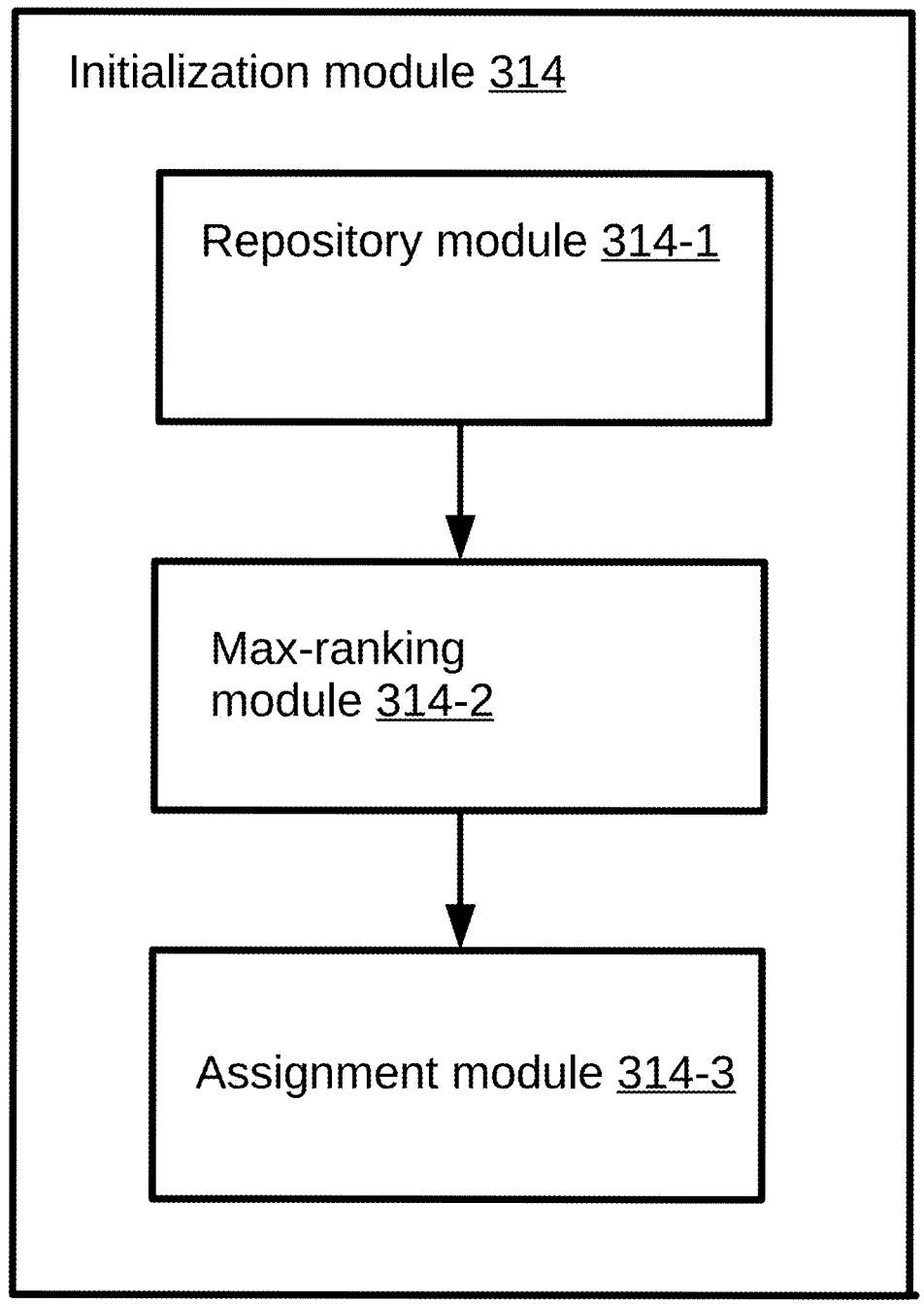
FIG. 3A shows the initialization module 314 in more detail.
Figure 3B:
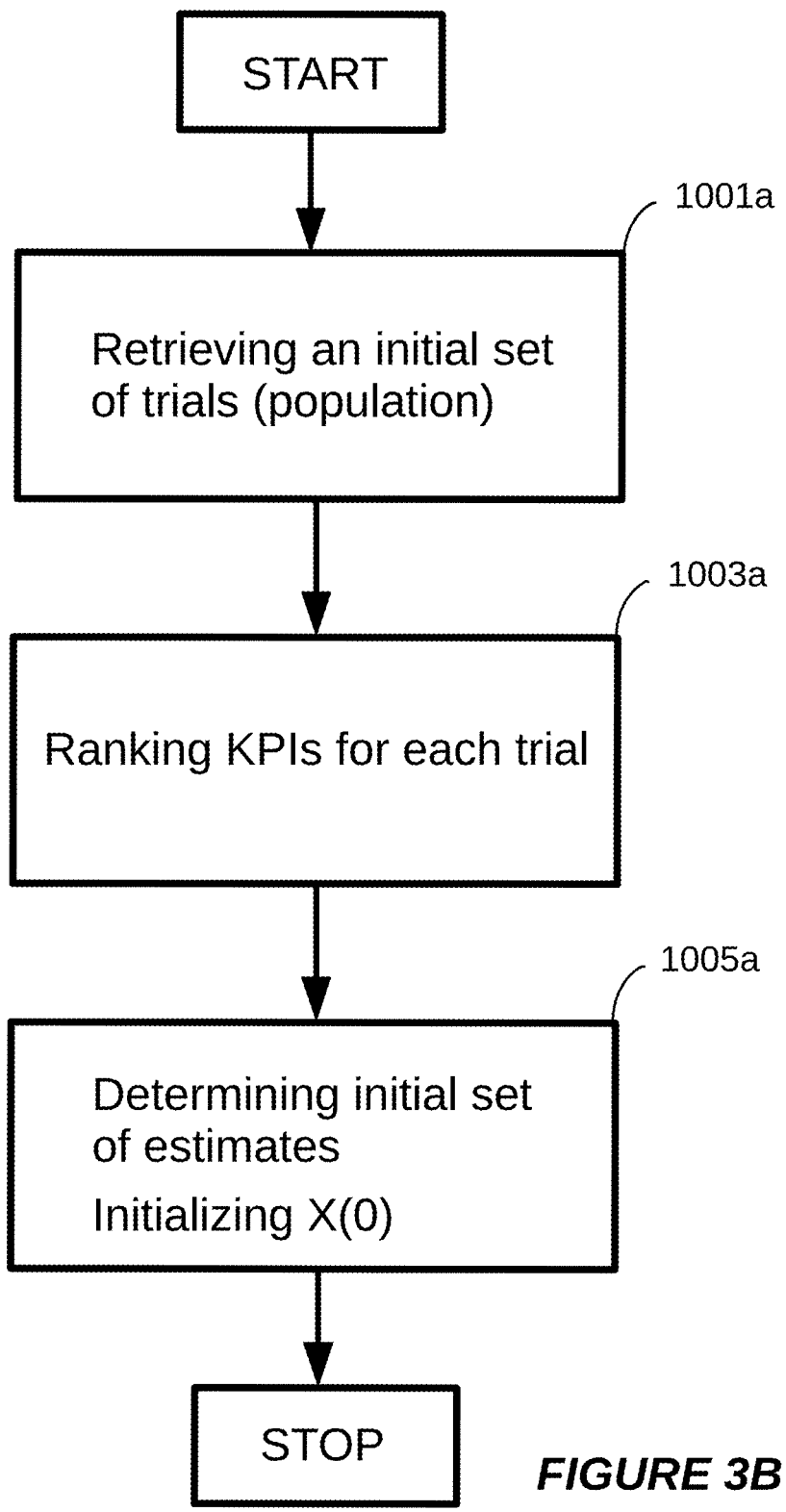
FIG. 3B shows the method of initializing an initial set of estimates.

The Optimizer 300 is shown in greater detail in FIG. 3. The Optimizer 300 has at least Search Space Modification Module 302, including Latin HyperCube Sampling Module (Algorithm2) 304 and another module 306 for Search Space Reduction and Selection of ISP Parameters; Re-Mapping Module 308; and Global Optimization Module (Algorithm2) 310, among other features described in the text below.

The system 1000 and corresponding modules include a memory device having computer readable instructions stored thereon for execution by a processor 312.

We propose an approach to this non-linear non-convex black-box optimization problem based on CMA-ES (Covariance Matrix Adaptation Evolution Strategy), described in "N. Hansen, A. Ostermeier, Completely derandomized self-adaptation in evolution strategies, Evolutionary Computation 9 (2001) 159-195." The CMA-ES-like optimizer is a suitable tool for the high-dimensional search space that the tuning process has to deal with. Also, it has been shown that it can be adapted to discrete variable space, described in "E. Benhamou, J. Atif, R. Laraki, A discrete version of cma-es, 2018." One can consider CMA-ES as a second-order iterative approach by estimating a positive covariance matrix on convex-quadratic functions. This matrix is closely related to the inverse Hessian as described in "N. Hansen, A. Ostermeier, Completely derandomized self-adaptation in evolution strategies, Evolutionary Computation 9 (2001) 159-195" and "N. Hansen, Benchmarking a BI-population CMA-ES on the BBOB-2009 function testbed, in: Workshop Proceedings of the GECCO Genetic and Evolutionary Computation Conference, ACM, 2009, pp. 2389-2395." This makes the method feasible for tuning camera ISP parameters which can be considered as a non-separable and badly conditioned problem.

Figure 2A:
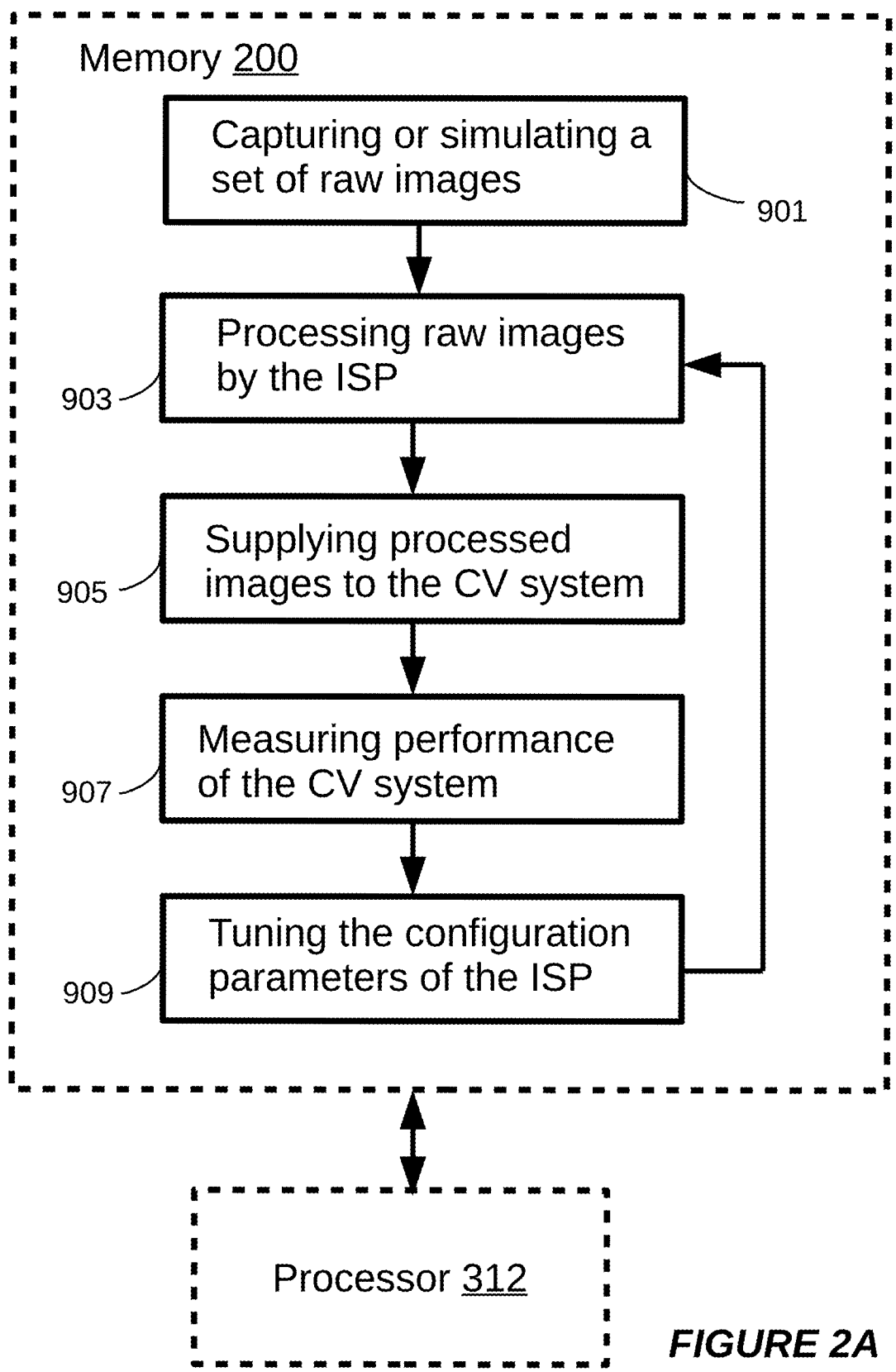
FIG. 2A illustrates a method for tuning an ISP according to the embodiments of the invention.
Figure 2B:
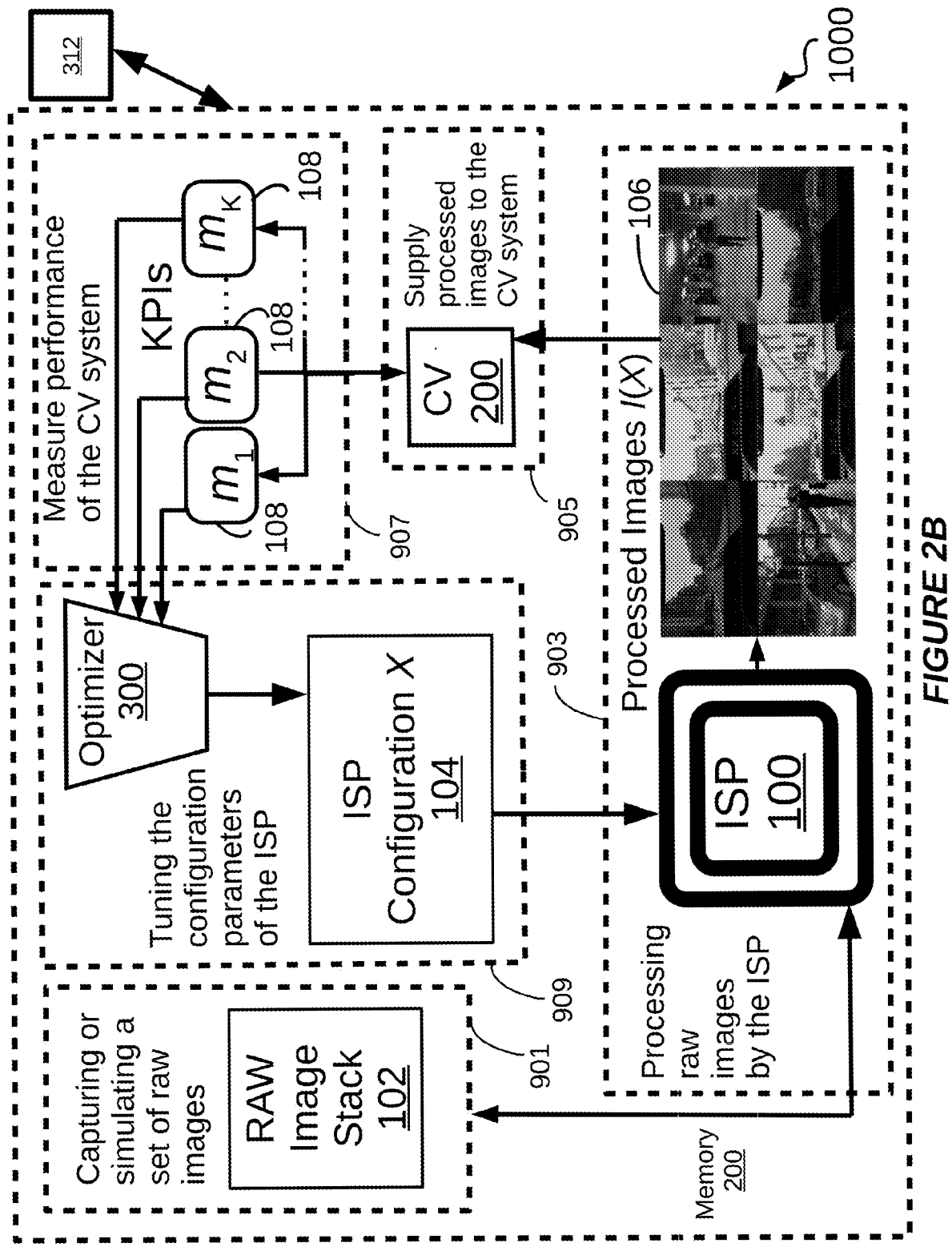
FIG. 2B illustrates the combined method and system for tuning an ISP according to the embodiments of the invention.

The method for tuning an ISP occurs inside a memory 200 with the aid of a processor 312. The method steps are shown in FIG. 2A, and the combined method and system are shown in FIG. 2B. The first step of capturing or simulating a set of raw images 901, occurs in the RAW image stack 102. The raw images are then processed by the ISP 100, in which the step of processing the raw images by the ISP 903 occurs. The processed images I(X) 106 are then supplied to the CV 200, where the step of supplying the processed images to the CV system 905 occurs. KPIs $m_1, m_2, \ldots, m_k$ 108 are then used for measuring the performance of the CV system 907. Tuning the configuration parameters of the ISP 909 occurs in the optimizer 300 and ISP configuration X 104.

Algorithm 1 summarizes the steps of the proposed global optimization module 310 performed by the processor 312. This is an evolutionary algorithm whose number of trials (population) and total number of iterations is defined as $\lambda$ and $N_{iter}$, respectively. In the algorithm, $X^{low}$ and $X^{high}$ denote a set of lower-bounds and higher-bounds of all the ISP parameters as $X^{low} = [x_1^{low}, \ldots, x_L^{low}]$ and $X^{high} = [x_1^{high}, \ldots, x_L^{high}]$, respectively. Prior to the main optimization process, i.e., Algorithm 1, these ranges are modified through a search space reduction technique (SSRT). We refer to these modified parameter ranges as current parameter ranges and denote them by $\tilde{X}^{low} = [\tilde{x}_1^{low}, \ldots, \tilde{x}_L^{low}]$, $\tilde{X}^{high} = [\tilde{x}_1^{high}, \ldots, \tilde{x}_L^{high}]$.

Corresponding search space bounds, normalized in the solver's acceptable range are denoted by $X^{low}$ and $X^{high}$. We also require to keep track of the KPI measurements and the loss function (objective) throughout the iterations. We denote them by $M = [m_1[X_1], \ldots, m_K[X_1]; \ldots; m_1[X_\lambda], \ldots, m_K[X_\lambda]]$ and $F = [f(m_1; X_1), \ldots, f(m_1; X_\lambda); \ldots; f(m_K; X_1), \ldots, f(m_K; X_\lambda)]$, respectively, and use them to calculate fitness Eq. (6), in module 318.

---

Algorithm 1: Proposed ISP parameter optimizer.

---

Require: $N_{iter}$, $\lambda$, $X^{low}$, $X^{high}$, $\tilde{X}^{low}$, $\tilde{X}^{high}$, $P^{(0)}$, $M^{(0)}$, $F^{(0)}$, $X^{low}$, $X^{high}$
1: $X^{(0)} \leftarrow$ initialize
2: $t \leftarrow 1$
3: while stop criterion is not satisfied & $t \leq N_{iter}$ do
4:  for j = 1 to $\lambda$ do
5:   $P_j \leftarrow$ generate population
6:   $I(P_j) \leftarrow$ run the ISP for $P_j$ (3)
7:   $M_j \leftarrow m_1[P_j], \ldots, m_K[P_j]$ (4)
8:   $F_j \leftarrow [f(m_1; P_j), \ldots, f(m_K; P_j)]$ (6)
9:  end for
10:  Update CMA-ES
11: $t \leftarrow t + 1$
12: end while
13: $X \leftarrow X^{(t)}$
14: return X

---

Initialization 314

---

Let a trial be a combination of ISP parameters for which the ISP output images and the corresponding CV metrics have been computed, so that its performance with respect to the target CV tasks can be compared to other such ISP parameter combinations. Thus, $P^{(0)}$ is defined as an initial set of trials provided to the optimizer whose objective components are denoted by $F^{(0)}$. We perform a max-rank strategy to initialize an estimate of the optimal solution, for at least some of the trials, or alternatively for all of the trials in the initial set of trials. Let superscript (0) denote the state before iterations begin, we first rank all KPI values per trial and find the maximum among them as Max-Rank($F_j^{(0)}$). Then, we assign each element of the initial estimate $X^{(0)}$ as $X_i^{(0)} = P_{j,i}^{(0)}$ where $\hat{j}$ is found as $$\hat{j} = \arg\min_{j, \forall j \in [1,\lambda]} [\text{Max-Rank}(F_j^{(0)})], s \cdot t \cdot P_{j,i}^{(0)} \in [\tilde{x}_i^{low}, \tilde{x}_i^{high}]. \qquad (8)$$

Max-Rank(.) returns max-rank-loss which is the method of computing multi-objective Chebyshev scalarization from the ranks corresponding to KPI values (a lower rank indicating a better KPI value) instead of the KPI or loss values themselves. A description of the Chebyshev scalarization is found in "Michael T. Emmerich and André H. Deutz. A tutorial on multiobjective optimization: Fundamentals and evolutionary methods. 17 (3):585-609, September 2018." Algorithm 1b illustrates Max-Rank(•), the computation of the weighted max-rank loss for a population denoted by P, weights is a vector of weights, one per loss. The losses, K of them per trial, are stored in $F^P$. In lines 3 to 5, one loss at a time, the loss values are ranked across all trials, and the ranks are then associated with the corresponding trial. In line 8, for each trial, the ranks are multiplied by the weight corresponding to the loss they were computed from, and the maximum of these weighted ranks for one trial is the max-rank loss for the trial.

---

Algorithm 1b: Weighted Max-Rank Loss Scalarization

---

Require: weights, P, $F^P$
1: $\lambda \leftarrow$ total number of trials in P
2: for k = 1 to K do
3:  for t = 1 to $\lambda$ do
4:   rank[t,k] $\leftarrow$ rank of $F^P$[t,k] within { $F^P$[s,k], s=1:$\lambda$ }
5:  end for
6: end for
7: for t = 1 to $\lambda$ do
8:  max-rank-loss[t] $\leftarrow$ max { weights[k] · rank[t,k], k=1:K }
9: end for
10: return max-rank-loss

---

Figure 3C:
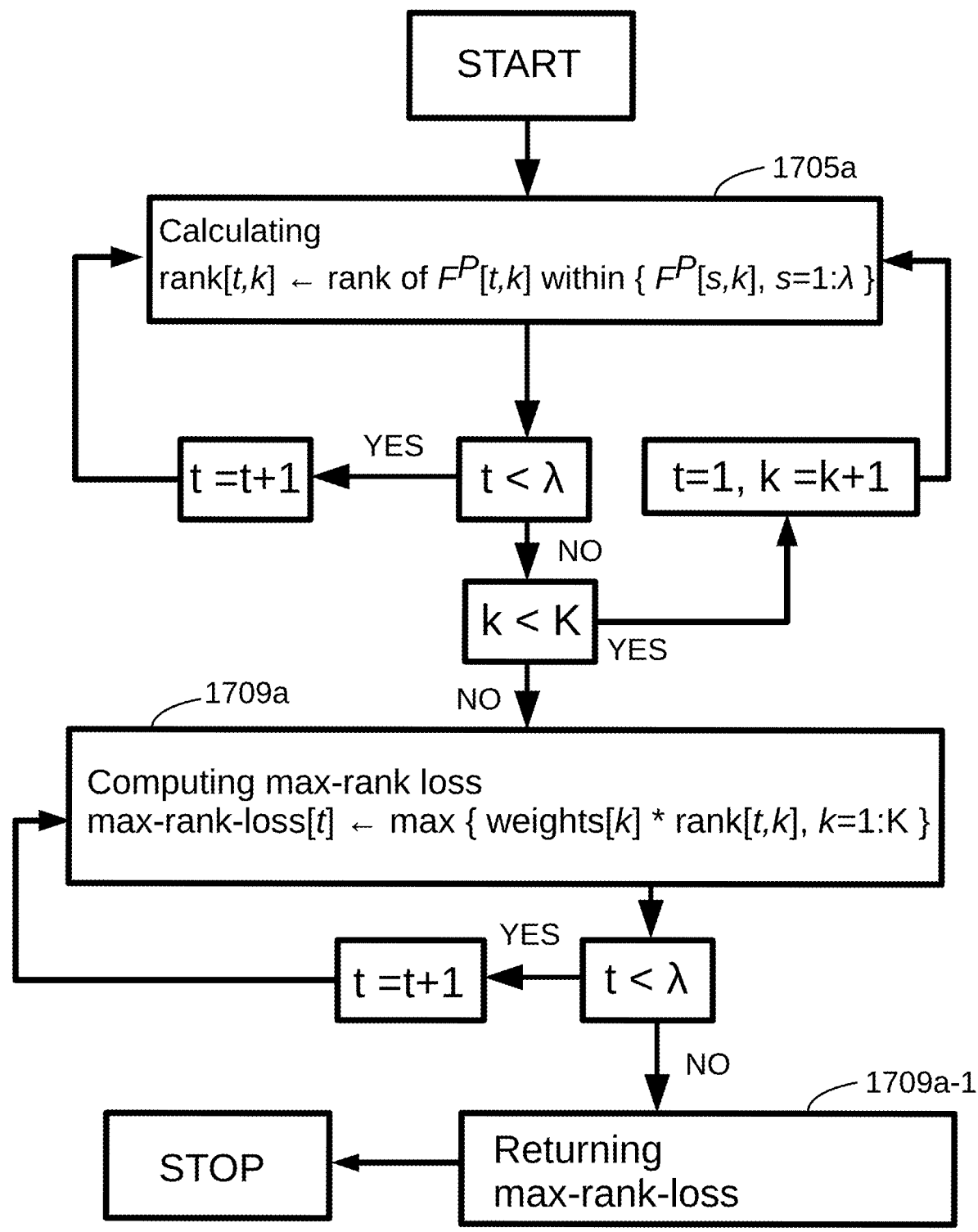
FIG. 3C shows the method of Max-Rank Loss Scalarization.
Figure 3D:
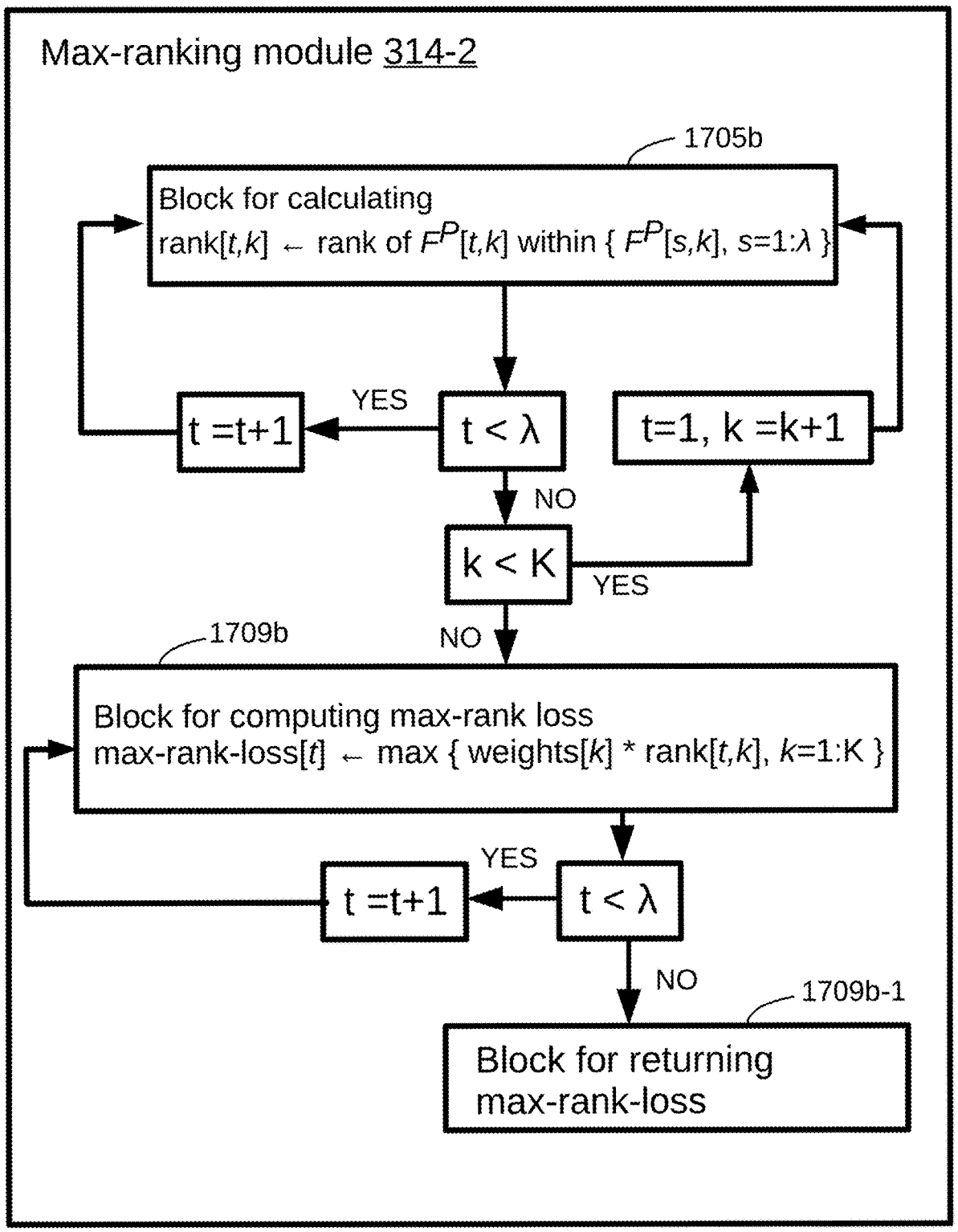
FIG. 3D shows the max-ranking module 314-2 in more detail.
Figure 3E:
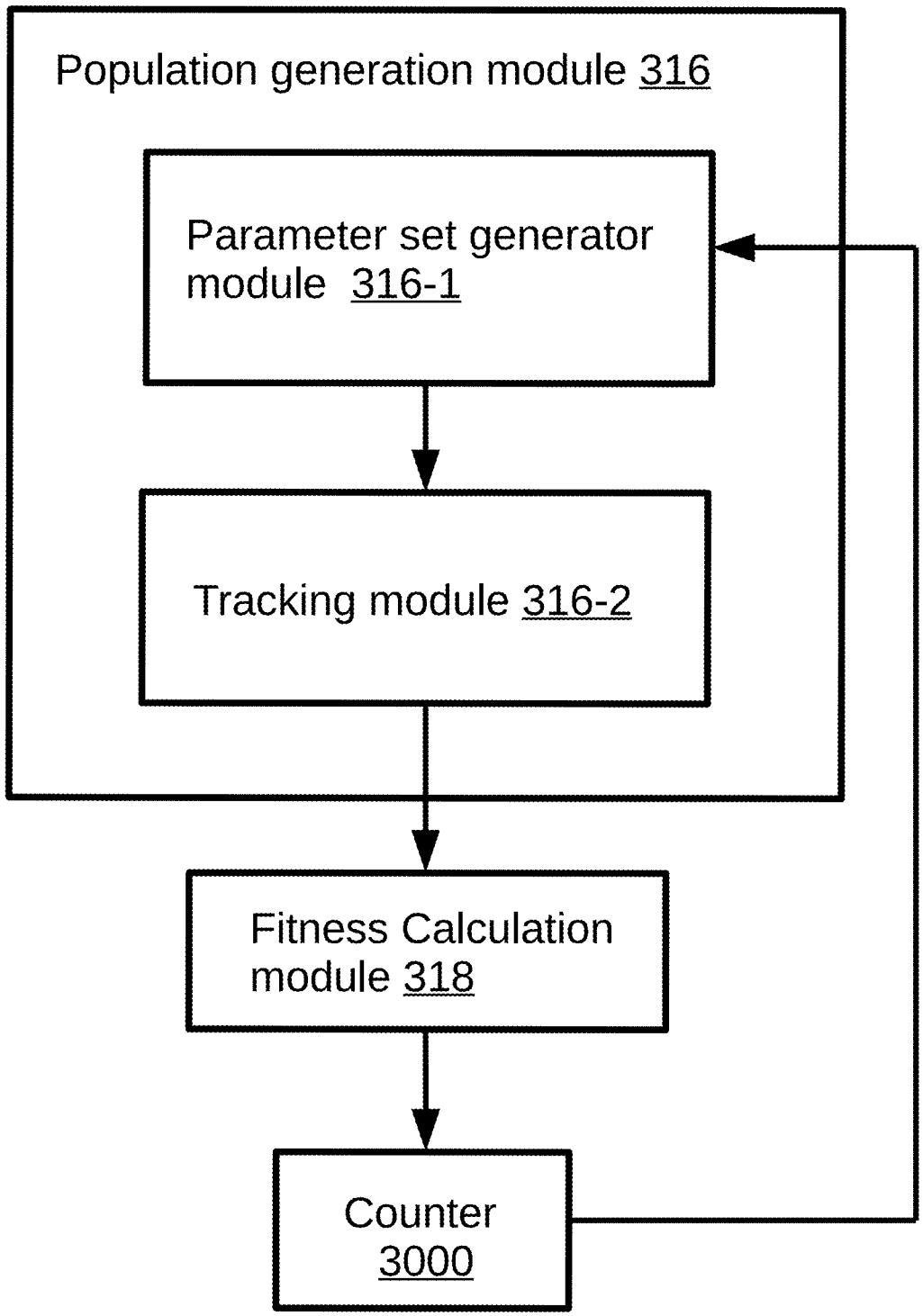
FIG. 3E shows the population generation module 316 in more detail.
Figure 3F:
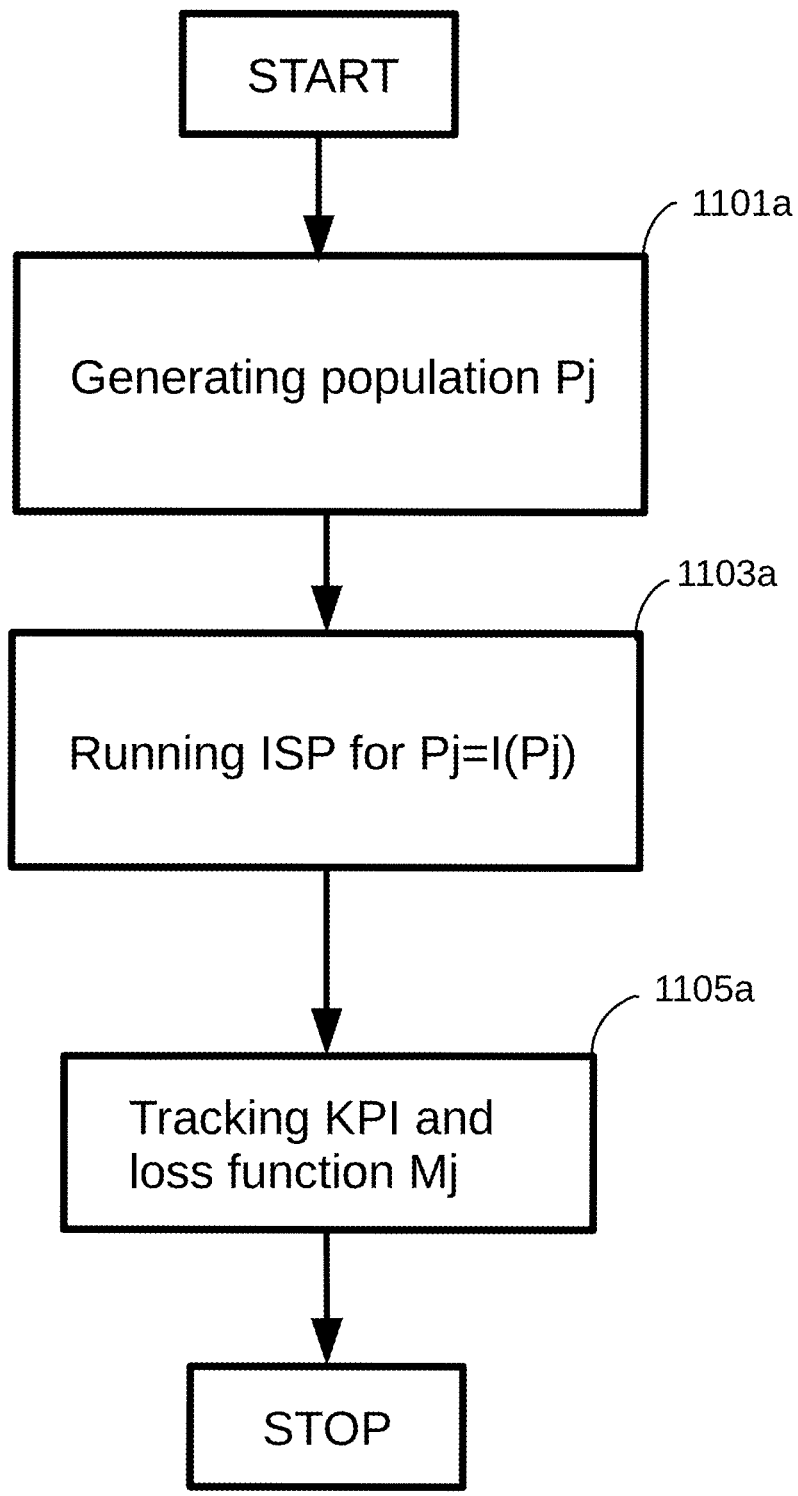
FIG. 3F shows the method of generating a population.
Figure 3G:
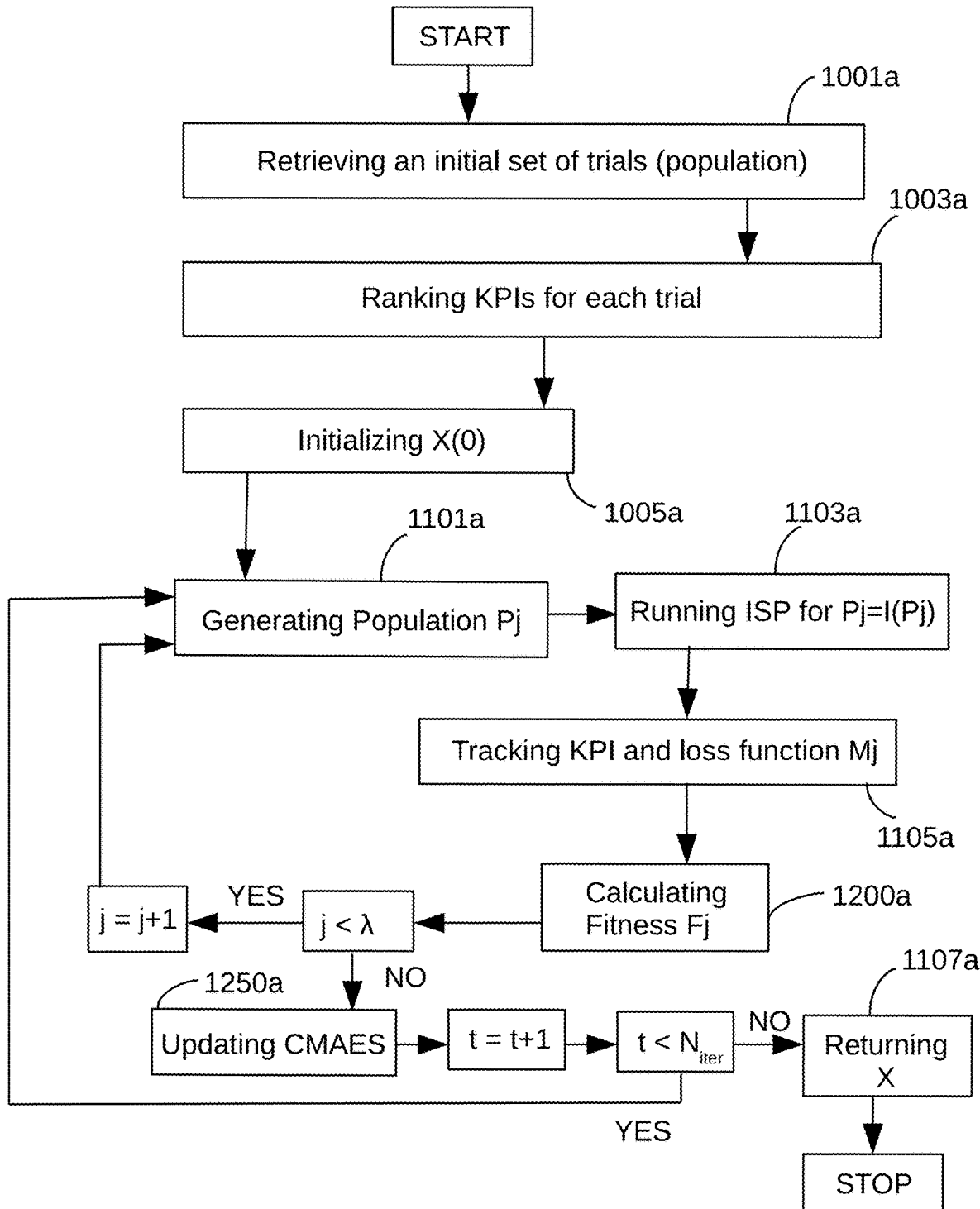
FIG. 3G shows the combined method of initializing an initial set of estimates and generating a population in the optimizer module 300.
Figure 3H:
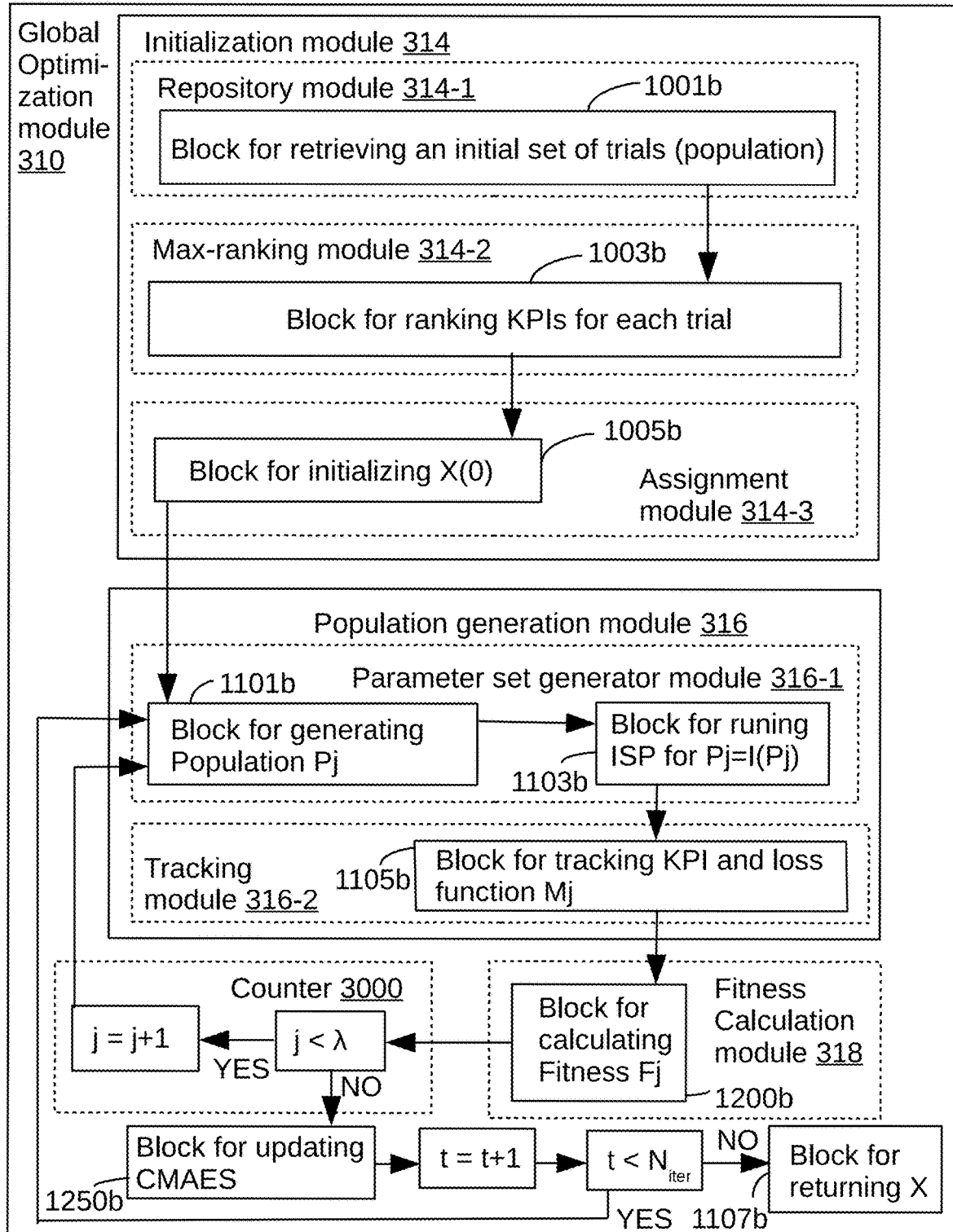
FIG. 3H shows the global optimization module 310 is more detail.

FIGS. 3, 3A, 3B, 3C and parts of FIGS. 3G and 3H show the method and system implementing Algorithm 1, which includes the initialization of an initial set of estimates of the configuration parameters, which occurs inside the initialization module 314 of the global optimization module 310. The step of retrieving an initial set of trials (population) 1001*a* occurs inside the block for retrieving an initial set of trials (population) 1001*b*, which in turn occurs in the repository module 314-1, while the ranking of key performance indicators (KPIs) 1003*a* for indicating the performance of the CV system occurs inside the block for the ranking of key performance indicators (KPIs) 1003*b*, which occurs in the max-ranking module 314-2. The method and system implementing Algorithm 1b is shown in FIGS. 3C, 3D and parts of FIGS. 3M and 3N. Finally, determining those configuration of parameters corresponding to top ranked KPIs 1005*a*, and initializing the X(0) estimates, occurs inside the block for initializing the X(0) 1005*b*, which occurs inside the assignment module 314-3.

Generating Population 316 and Re-Mapping 308 via Mirroring

A normal distribution with mean equal to the current estimate and a covariance matrix $(\sigma^{(t)})^2 C^{(t)}$ is evolved during the iterations of the optimizer. Consequently, at every iteration $\lambda$ number of parameter sets denoted by P are generated as $$P_j = \mathcal{N}(X^{(t)}, (\sigma^{(t)})^2 C^{(t)}), \forall j \in [1, \lambda]$$

in module 316 where $$\mathcal{N}(\cdot)$$

is a multivariate normal distribution.

Depending on the value of $\sigma$, the population generated by the normal distribution can lie well beyond the bounds defined by the SSRT. The generated population then needs to be remapped, in module 308, back to the search bounds $X^{low}$, $X^{high}$.

FIGS. 3, 3E, 3F and parts of FIG. 3G show the method and system implementing Algorithm 1, which includes generating the population of configuration parameters, which occurs inside the population generation module 316 of the global optimization module 310. The steps of generating the population Pj 1101a and running the ISP for Pj=I(Pj) 1103a occur respectively in the blocks for generating the population Pj 1101b and the block for running the ISP for Pj=I(Pj) 1103b, which both are situated in the parameter set generator module 316-1, which is shown in FIGS. 3E, 3F and part of FIGS. 3G and 3H. The step of tracking KPI and loss function Mj 1105a occurs inside the block for tracking KPI and loss function Mj 1105b, which in turn occurs inside the tracking module 316-2.

Instead of clipping the population at the boundary, the population outside of the search bounds is mirrored back about the bounds. This is done as otherwise for large $\sigma$ a lot of points would be at the boundary of the search bounds.

Figure 4A:
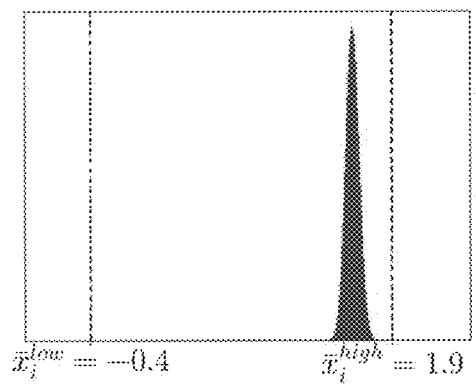
FIGS. 4A, 4B and 4C illustrate principles of remapping performed by the Re-Mapping module 308 of FIG. 3, remapping a generated population to the reduced search space via mirroring, with the distribution of the original population corresponding to standard deviation $\sigma=0.05$, $\sigma=0.3$, and $\sigma=2.0$, respectively with a mean value equal to 1.6, red histograms corresponding to the remapped distributions, and the original population shown in blue.
Figure 4B:
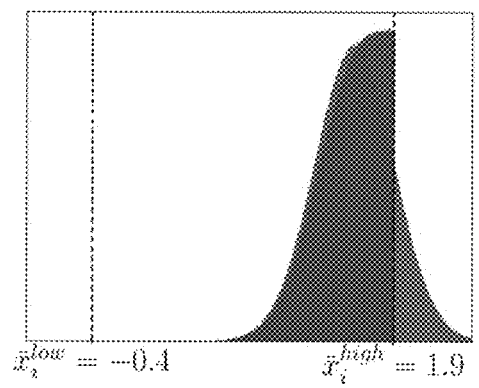
Figure 4C:
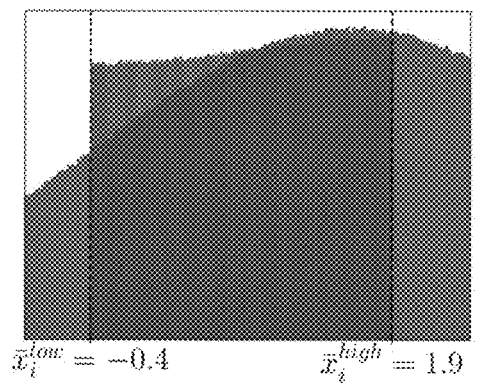

In the embodiments of the present invention, re-mapping of the generated population to the reduced search space via mirroring is performed. The mirroring based remapping is shown in FIGS. 4A, 4B and 4C for small to large standard-deviation of the generated population. The large value of $\sigma$ leads to a lot of points away from the mean of the distribution, resulting in a lot of exploration of the search space. This is useful at the start of the optimization process when a large portion of search space is unknown to the optimizer. For small $\sigma$, most of the points lie near the mean of the distribution resulting in local exploration of ISP parameter space. This is particularly useful during the final convergence. Finally, the generated population is mapped to the original ISP parameter space i.e., $$P_{j,l} = \mathcal{X}_l^{low} + P_{j,l}(\mathcal{X}_l^{high} - \mathcal{X}_l^{low}), \forall l \in [1, L] \text{ and } \forall j \in [1, \lambda].$$

In FIGS. 4A, 4B and 4C, from left to right, the distribution of the original population is $\sigma=0.05$, $\sigma=0.3$, and $\sigma=2.0$, respectively with the mean equal to 1.6. Red histogram is the remapped distribution of the original population shown in blue.

Figure 4D:
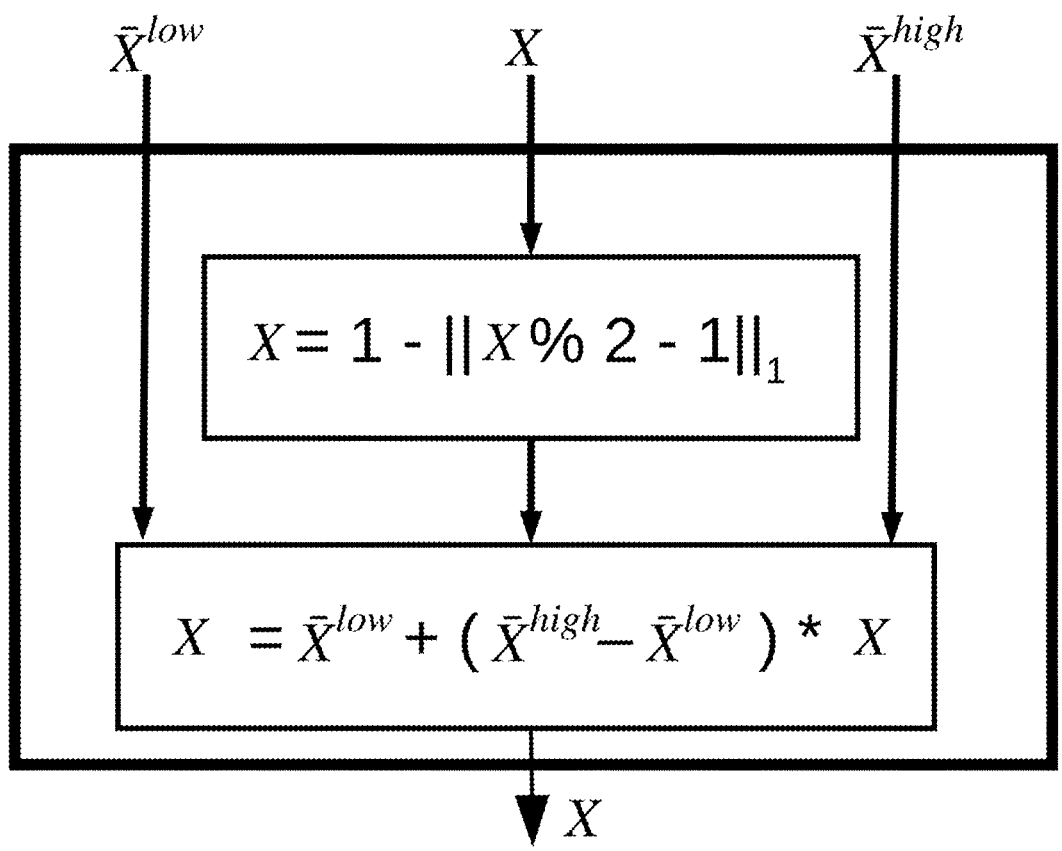
FIG. 4D illustrates a flow-chart illustrating the operation of the Re-Mapping module 308.

The operation of the re-mapping module 308 is illustrated by a flow-chart of FIG. 4D.

Updating CMA-ES (Covariance Matrix Adaptation Evolution Strategy)

The results of building a multi-objective loss function with regard to the measure of performance done by tracking KPIs and loss function Mj 1005 in the tracking module 316-2, are then used for calculating the fitness Fj 1200a in the block for calculating fitness Fj 1200b, which in turn occurs in the fitness calculation module 318, shown in FIG. 3E and parts of FIGS. 3G and 3H.

The results of the fitness calculation are then used to apply an evolutionary algorithm (having a number of trials or population) to the multi-objective loss function (6) to determine the configuration parameters of the ISP as they were tuned, which thereby results in a global optimization of at least two or more modules of the ISP simultaneously. A counter 3000 ensures that $\lambda$ trials are completed.

This step involves updating mean, covariance and other parameters of CMA-ES based on the fitness values found in the current iteration. This step involves updating the CMAES 1250a in FIG. 3G and the block for updating the CMAES 1250b in FIG. 3H. Refer to "N. Hansen, Benchmarking a BI-population CMA-ES on the BBOB-2009 function testbed, in: Workshop Proceedings of the GECCO Genetic and Evolutionary Computation Conference, ACM, 2009, pp. 2389-2395" for more details. The fitness for each trial is first ranked. Then, the maximum rank is used as the final fitness of the trial. Finally, X is returned 1107a in the block for returning X 1107b (FIGS. 3G and 3H).

---

Algorithm 2: Latin Hyper-cube (LH) sampling.

Require: $N_{iter}$, $\lambda$, $X^{low}$, $X^{high}$
1: LH ← generate LH
2: for j = 1 to $\lambda$ do
3:   I(LH$_j$) ← run the ISP for LH$_j$ (3)
4:   M$_j$ ← m$_1$[LH$_j$],...,m$_K$[LH$_j$] (4)
5:   F$_j$ ← [f(m$_1$; P$_j$),...,f(m$_K$; P$_j$)] (6)
6: end for
7: F$^{LH}$ ← F
8: M$^{LH}$ ← M
9: return LH, F$^{LH}$, M$^{LH}$

---

Figure 3I:
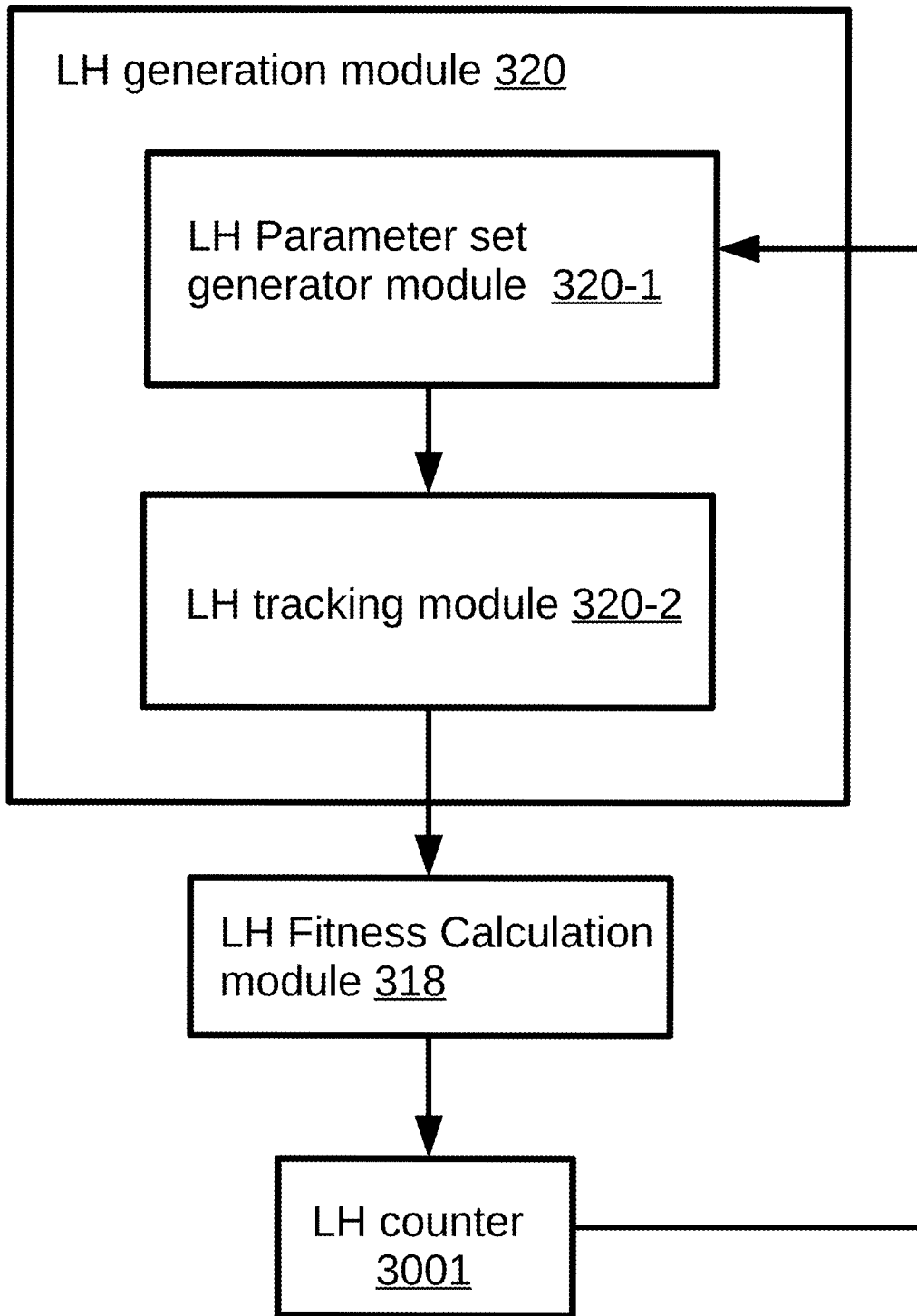
FIG. 3I shows the LH generation module 320.
Figure 3J:
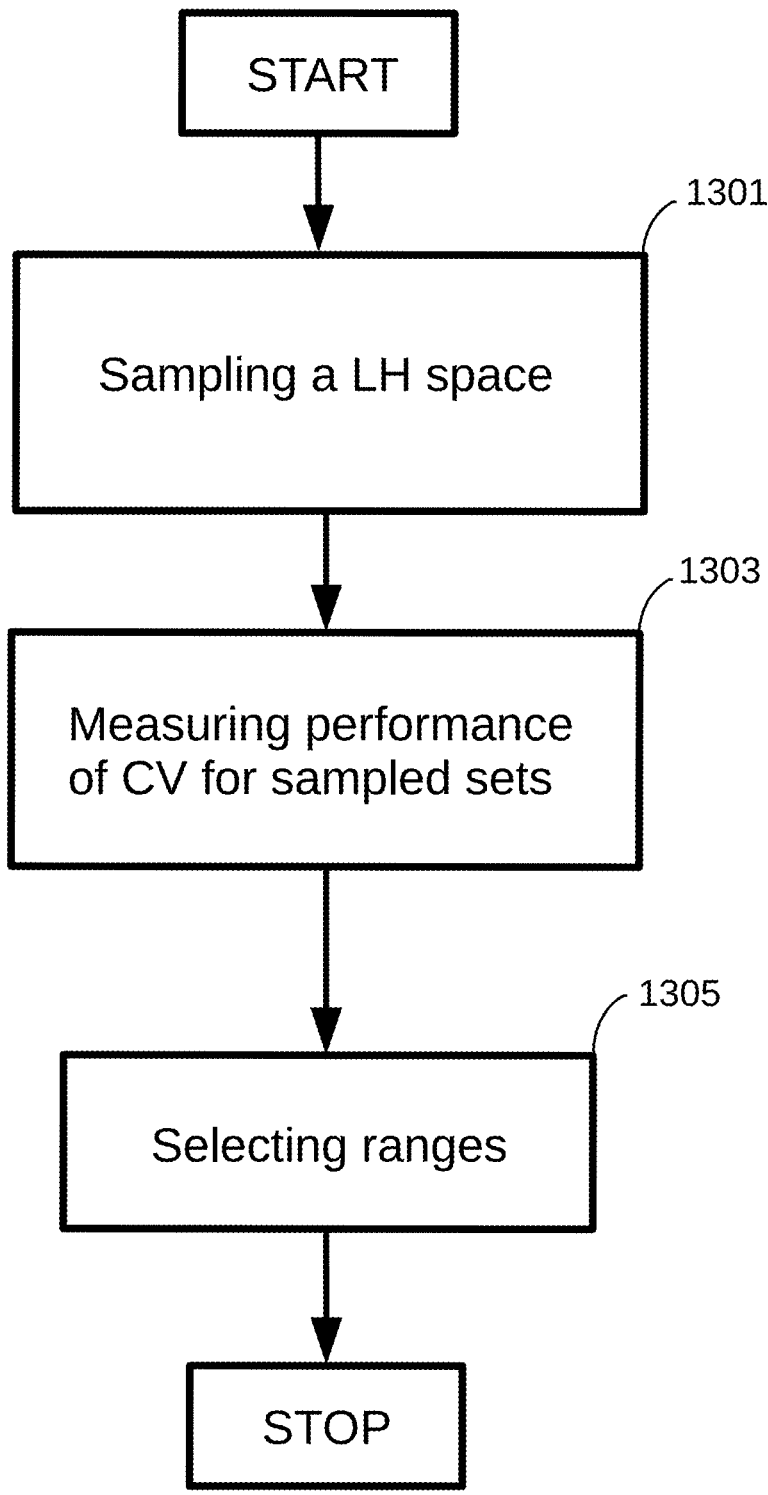
FIG. 3J shows the method of reducing the number of combinations of the configuration parameters of the ISP.
Figure 3K:
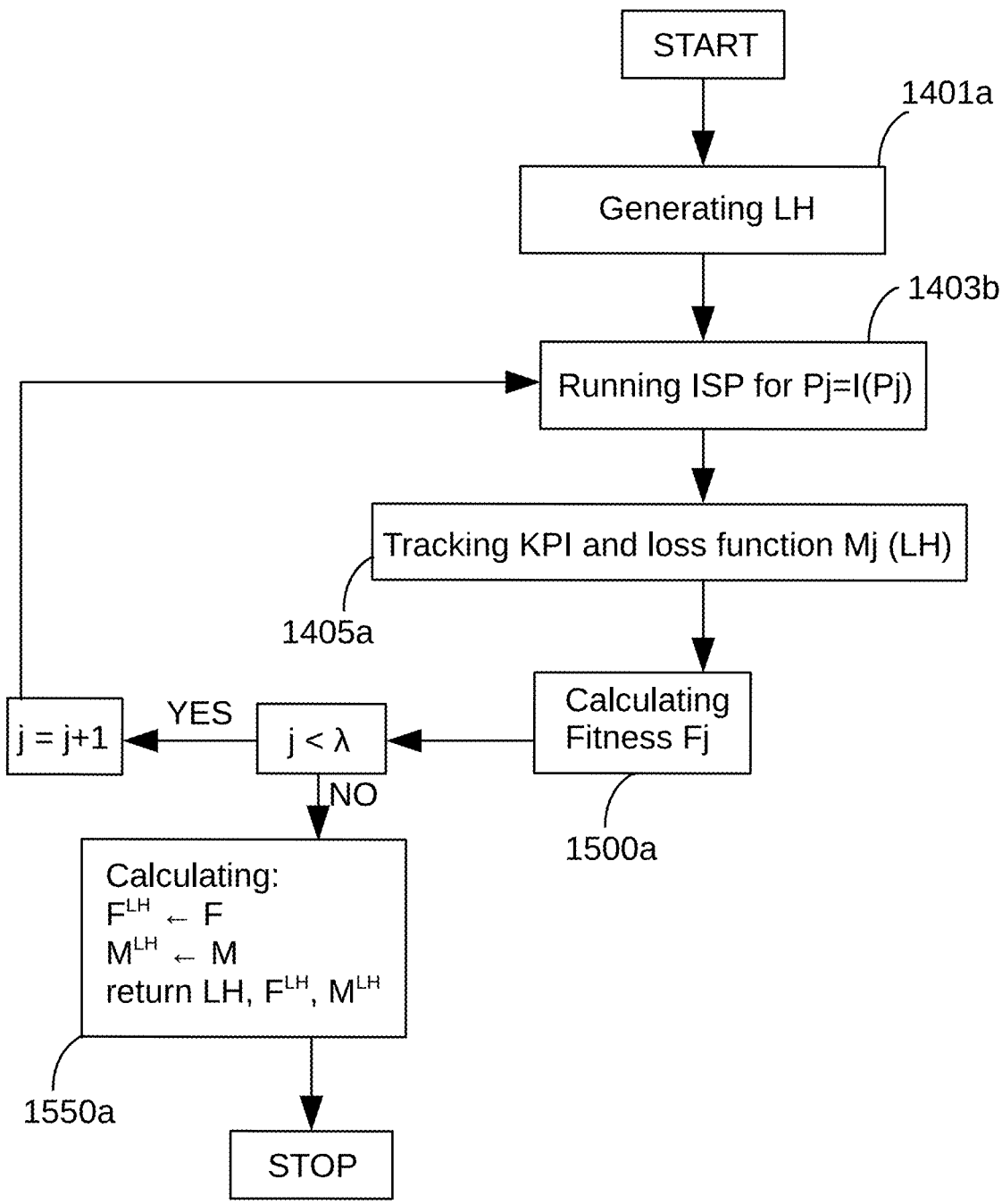
FIG. 3K shows method of Latin Hyper-cube (LH) sampling.
Figure 3L:
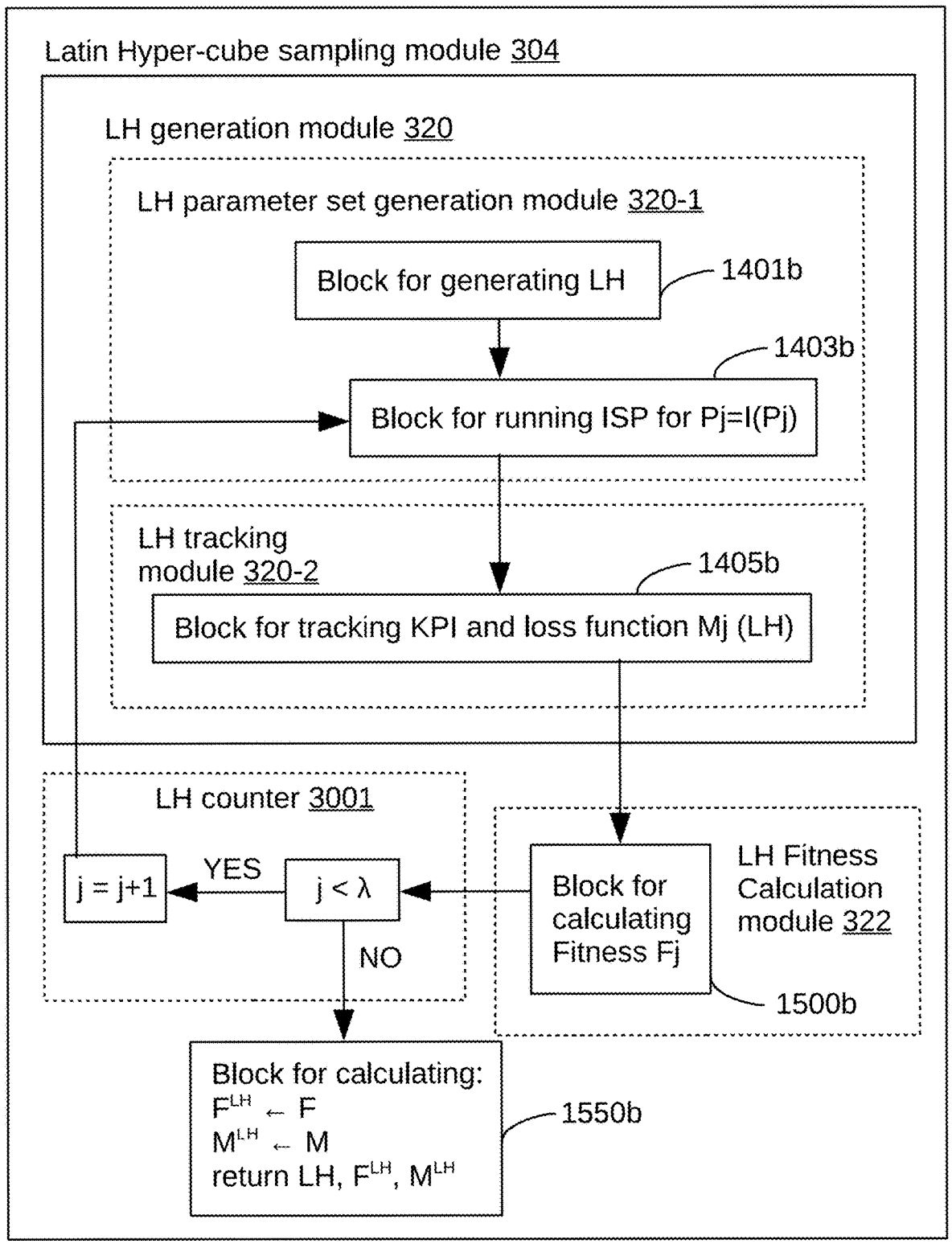
FIG. 3L shows the Latin Hyper-cube sampling module 304 in more detail.
Figure 3M:
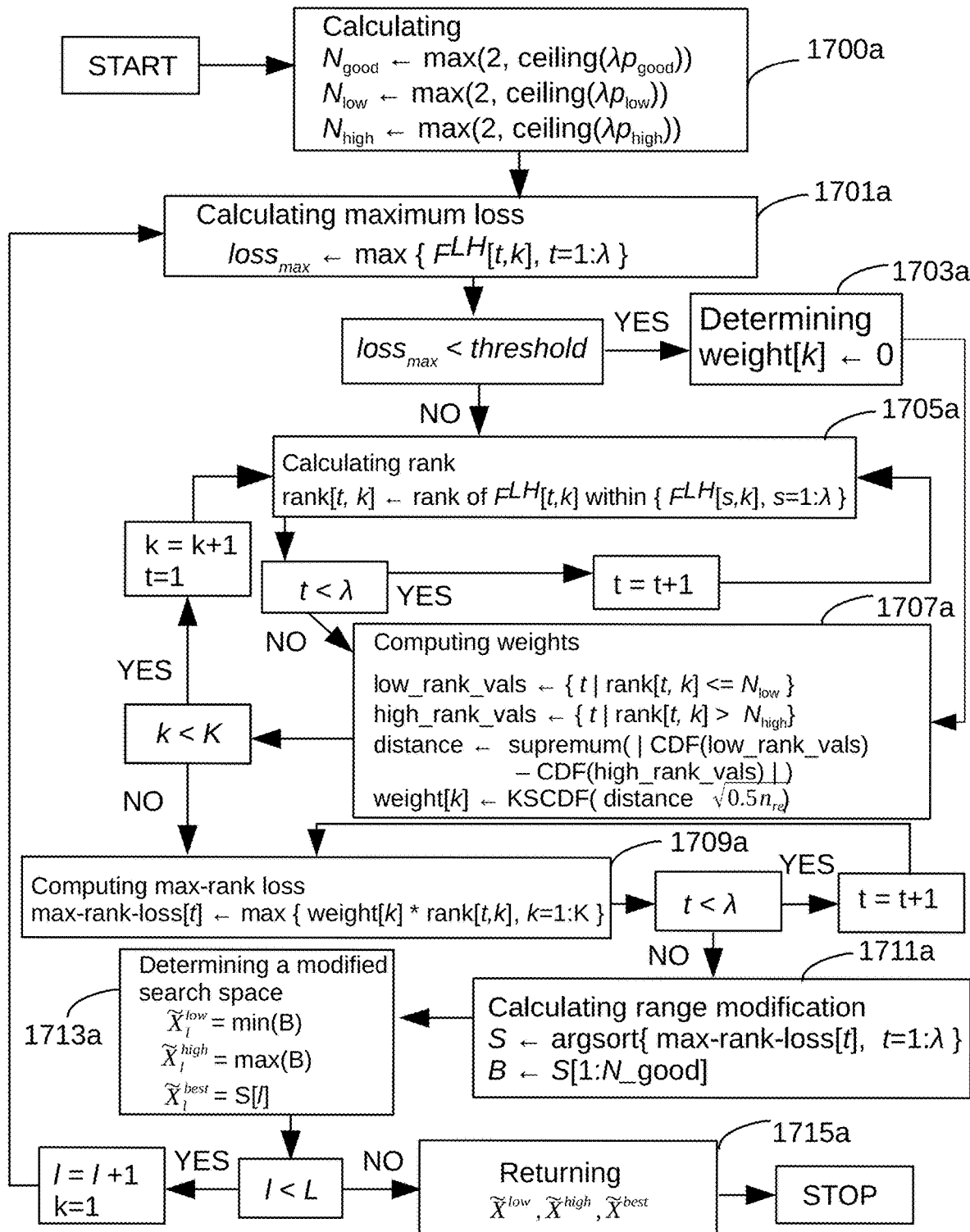
FIG. 3M shows the method of the Search Space Reduction Technique (SSRT)
Figure 3N:
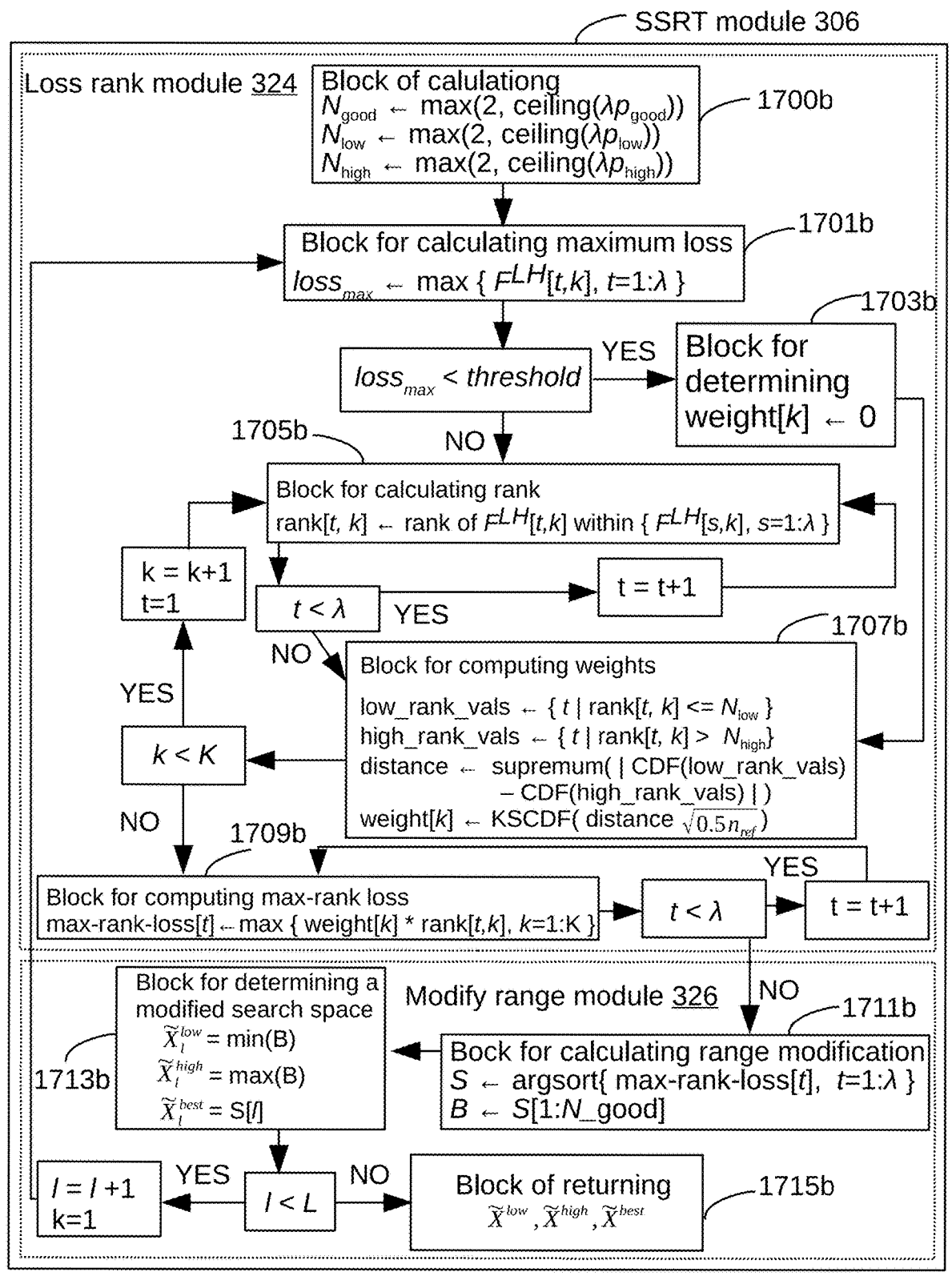
FIG. 3N shows the Search Space Reduction Technique module 306 in more detail.

FIGS. 3I, 3K and 3L shows the method and system implementing the Algorithm 2, which is performed in the LH generation module 320 of the Latin Hyper-cube sampling module 304, used for reducing a number of combinations of the configuration parameters of the ISP (ISP sets). The steps of generating the population LH 1401a and running the ISP for Pj=I(Pj) 1403a occur respectively in the blocks for generating the population Pj 1401b and the block for running the ISP for Pj=I(Pj) 1403b, which both are situated in the LH parameter set generator module 320-1. The step of tracking KPI and loss function Mj (LH) 1405a occurs inside the block for tracking KPI and loss function Mj 1405b, which in turn occurs inside the LH tracking module 320-2.

The results of building a multi-objective loss function with regard to the measure of performance done by tracking KPIs and loss function Mj (LH) 1405a in the LH tracking module 320-2, are then used for calculating the fitness Fj 1500a in the block for calculating fitness Fj 1500b, which in turn occurs in the LH fitness calculation module 322. A LH counter 3001 ensures that $\lambda$ trials are completed, after which LH data is returned 1550a (in block for returning LH data 1550b). These steps are shown in FIG. 3I and parts of FIGS. 3K and 3L.

Reducing Search Space (Module 302)

We perform a Latin Hyper-cube (LH) sampling (module 304) in order to save some processing time when running the optimizer. The Latin Hyper-cube sampling generates combinations of ISP parameters such that each parameter's range is well sampled and such that sampled pairs of parameters are uncorrelated, as described in "M. D. McKay, R. J. Beckman, W. J. Conover, Comparison of three methods for selecting values of input variables in the analysis of output from a computer code, Technometrics 21 (1979) 239-245" and "T. Torsney-Weir, A. Saad, T. Moller, H.-C. Hege, B. Weber, J.-M. Verbavatz, S. Bergner, Tuner: Principled parameter finding for image segmentation algorithms using visual response surface exploration, IEEE Transactions on Visualization and Computer Graphics 17 (2011) 1892-1901."

FIG. 3J show the method of reducing the number of combinations of the configuration parameters of the ISP. The first step is sampling a Latin Hyper-Cube space 1301 with regard to the configuration parameters of the ISP, then measuring the performance of the CV for sampled sets 1303, in other words for the ISP sets sampled in the step 1301. The final step is selecting ranges 1305 for configuration parameters based on those ISP sets which result in the measure of performance of the CV system above a predetermined threshold.

Algorithm 2 presents the procedure to generate LH samples with regard to the ISP parameters. It should be noted that nested hyper cube samples are generated in step 1 in module 320. For the first hyper cube, the center of distribution is defined as $c_l = (x_{SP_l} - x_l^{low})/(x_l^{high} - x_l^{low})$, $\forall l \in [1, L]$ where $x_{ISP_l}$ denotes the default parameter value that comes with the ISP. These default values can be the parameters recommended by the ISP manufacturer, or a set of parameters tuned for IQ purposes, or even a set of parameters loosely hand-tuned by a user. For each sample of the LH we need to calculate the fitness in module 322 which is then consumed by a SSRT.

---

Algorithm 3: The search space reduction technique (SSRT)

---

Require: $p_{good}$, $p_{low}$, $p_{high}$, threshold, $n_{ref}$, K, L, LH, $F^{LH}$
1: $\lambda \leftarrow$ total number of trials in LH
2: $N_{good} \leftarrow \max(2, \text{ceiling}(\lambda p_{good}))$
3: $N_{low} \leftarrow \max(2, \text{ceiling}(\lambda p_{low}))$
4: $N_{high} \leftarrow \max(2, \text{ceiling}(\lambda p_{high}))$
5: for l = 1 to L do
6:   for k = 1 to K do
7:     $loss_{max} \leftarrow \max \{ F^{LH}[t,k], t=1:\lambda \}$
8:     if $loss_{max} <$ threshold
9:       weight[k] $\leftarrow$ 0
10:    else
11:      for t = 1 to $\lambda$ do
12:        rank[t, k] $\leftarrow$ rank of $F^{LH}[t,k]$ within $\{ F^{LH}[s,k], s=1:\lambda \}$
13:      end for
14:      low_rank_vals $\leftarrow \{ t \mid \text{rank}[t, k] <= N_{low} \}$
15:      high_rank_vals $\leftarrow \{ t \mid \text{rank}[t, k] > N_{high} \}$
16:      distance $\leftarrow$ supremum( | CDF(low_rank_vals) − CDF(high_rank_vals) | )
17:      weight[k] $\leftarrow$ KSCDF( distance $\sqrt{0.5 n_{ref}}$ )
18:    end if
19:  end for
20: for t = 1 to $\lambda$ do
21:   max-rank-loss[t] $\leftarrow \max \{$ weight[k] * rank[t,k], k=1:K $\}$
22: end for
23: S $\leftarrow$ argsort{ max-rank-loss[t], t=1:$\lambda$ }
24: B $\leftarrow$ S[1:N_good]
25: $\tilde{x}_l^{low} \leftarrow \min B$
26: $\tilde{x}_l^{high} \leftarrow \max B$
27: $\tilde{x}_l^{best} \leftarrow$ S[1]
28: end for
29: return $\tilde{x}^{low}$, $\tilde{x}^{high}$, $\tilde{x}^{best}$

---

We then modify the search space for each parameter by applying a SSRT in module 306. The steps of SSRT are shown in Algorithm 3.

A key functionality of Algorithm 3 is that, for each parameter and KPI, a non-negative weight that quantifies whether the value of the parameter has an impact on the value of the loss associated with the KPI, is estimated. This weight should be low when the impact of the parameter on the loss is small, and high when the impact is significant. For each parameter-KPI pair, such a weight can be obtained by comparing the distribution of the values of the parameter for the trials that give the best (that is, lowest) loss values loss that corresponds to the KPI, to the distribution of the values for the trials that give the worst (that is, highest) loss values. $p_{low}$ is the proportion of the trials of the population (generated by Latin Hypercube sampling, for example) which is identified, through ranking, as having low (good) loss values for one KPI. Similarly, $p_{high}$ is the proportion of trials which is identified as having high (bad) loss values.

$p_{good}$ is an analogous quantity which is, however, used differently: Once the trials have been ranked based on weighted max-rank loss values (this weighted max-rank loss involving all KPIs, with the weights computed for the parameter under consideration), $p_{good}$ is the proportion of the trials, specifically those with lowest weighted max-rank, from which we extract parameter values that the reduced search range for the parameter under consideration must contain. (The smallest containing interval is used.) Reducing $p_{good}$ leads to more aggressive but less stable search space reduction (stability is restored with additional sampling).

Values of p_good ranging from 2 to 30% have been used successfully. $p_{low}$ and $p_{high}$ can generally be set to the same value. as $p_{good}$. Alternatively, 5%-15% of the best trials may be used, or yet alternatively, 10%-30% of the best trials may be used if required. It is understood that yet another percentage range for selecting best trials may be chosen depending on how much the modified search range needs to be narrowed.

The threshold is a parameter that is used to perform a very simple test of significance. The value of threshold should be set to a loss value which corresponds to KPI values considered satisfactory, in fact, considered equally good. For example, when losses that have been derived from KPIs for which the value 0 is good enough in exact arithmetic, threshold can be set to a small multiple of machine epsilon. Other threshold values, possibly different for each KPI, can be used. Clearly, ranking trials based on a KPI that always "passes requirements" within the sample would be pointless. Consequently, in Algorithm 3, if all the loss values for a KPI are below the threshold, the parameter is deemed to have insignificant impact on loss values, and the corresponding weight is set to 0 in the weighted max-rank loss used to narrow the parameter's search range.

One way to compute a weight quantifying the impact of a parameter on a KPI is to use a p-value. Specifically, 1 minus the p_value (or any non-negative function of the p-value that has a negative slope) can be used to construct a useful weight. For many tests, the p-value is equal to 1 minus the value of a cumulative distribution function (CDF) evaluated over a key statistic. Consequently, any non-negative function of the underlying CDF that has a positive slope can be used as a weight. Algorithm 3 shows a computation based on the Kolgomorov-Smirnov CDF (named KSCDF) of the two sample Kolgomorov-Smirnov distribution comparison test with small number of observations, as described in "James Durbin. Distribution Theory for Tests Based on the Sample Distribution Function. SIAM, 1973." $n_{ref}$ is a normalization parameter making explicit the number of observations parameterizing the test ($n_{ref}$=10 works well in practice). Because the p-value-based weight is computed directly from the CDF, the p-value itself does not explicitly appear in Algorithm 3.

Other non-parametric two-sample distribution comparison test CDFs than Kolgomorov-Smirnov can be used to compute the weight, for example those of Anderson-Darling, as described in "Scholz, Fritz W., and Michael A. Stephens. K-sample Anderson-Darling tests. Journal of the American Statistical Association 82.399 (1987): 918-924" or in "Kuiper, Nicolaas H. Tests concerning random points on a circle. Nederl. Akad. Wetensch. Proc. Ser. A. Vol. 63. No. 1. 1960." Instead of using the Kolgomorov-Smirnov CDF one can use the statistic directly (distance in Algorithm 3) to compute weights. Another alternative to using weights derived from p-values is to only keep KPIs for which a two sample comparison test rejects the hypothesis of equality of distribution of parameter values between the set of trials performing well with respect to that KPI and the set of trials performing worse with respect to that KPI. For instance one can use a two-sample Kolgomorov-Smirnov test or a Pearson's chi-squared test, as described in "Plackett, Robin L. Karl Pearson and the chi-squared test. International Statistical Review/Revue Internationale de Statistique (1983): 59-72." We argue that our approach is better. Because all the corresponding losses are used in the computation of the max-rank loss, albeit with different weights, the computation of these narrowed configuration parameter search ranges is more stable (there is less variation in the results when the population than if KPIs are kept or discarded. The inferiority of all these alternative was verified by comparative testing.

Algorithm 3 shows the computation of the reduced search intervals $[X_l^{low}, X_l^{high}]$ for all l. A good parameter value, $X_l^{best}$, is also returned for each l. Typically, $p_{good}$, $p_{low}$, and $p_{high}$ are set to the same value, between 0.02 (2%) and 0.1 (10%), and $n_{ref}$ is set to 10. First, one has to determine whether a KPI is significant. In line 9, the maximum value of the k-th loss over all the trials is computed. If this maximum loss value is small enough, threshold being a loss value considered acceptable in all cases, the corresponding KPI is ignored in the rest of the process. These steps correspond to the hypothesis-test. In lines 11 to 17, the weight of each loss for the parameter under consideration is computed. First (lines 11 to 13), the rank of each trial with respect to the k-th loss is computed. (This rank is the same for all parameters, and consequently it can be computed exactly once.) In line 14, the values of the parameter under consideration for the $N_{low}$ best ranked trials are gathered. In line 15, we gather the values of the parameter for the $N_{high}$ worst ranked trials. In line 16, the L-infinity (max) distance between the CDFs of the two groups of parameter values is computed for each loss. This distance is normalized, and the weight is then set to the corresponding large sample Kolgomorov-Smirnov Cumulative Distribution Function (KSCDF) value (line 17). This completes the computation of each loss' weight for the parameter under consideration. The max-rank loss, weighted this time, is then computed for each trial (lines 20 to 22). Lines 23 and 24 identify the $N_{good}$ parameter values with best weighted max-rank loss, and the narrowed search interval for the ISP parameter under consideration is set to range from their minimum to their maximum. The parameter value with very best max-rank loss is also returned for each ISP parameter. This will provide a modified range of parameters as $X^{low}$, $X^{high}$ in module 326.

An advantage of the above-mentioned steps is that the computations in the global optimization module 310 converge to an optimal solution quickly and accurately. The global optimization module 310 works also independently from the SSRT module 302 and re-mapping module 308, especially when the initial configuration is close to the optimal one.

FIGS. 3, 3C, 3D, 3M and 3N show the method and system implementing the Algorithm 3. After calculating $N_{good}$, $N_{low}$, $N_{high}$ trials 1700a in the block for calculating $N_{good}$, $N_{low}$, $N_{high}$ trials 1700b, the next step is determining whether a KPI is significant by calculating maximum loss 1701a in the block for calculating maximum loss 1701b, i.e, if this maximum loss value is small enough, threshold being a loss value considered acceptable in all cases, the corresponding KPI is ignored in the step 1703a in the block 1703b. The rank of each trial with respect to the k-th loss is computed by calculating rank 1705a in the block for calculating rank 1705b, and then the weight of each loss for the parameter under consideration is the step for computing weights 1707a in the block for computing weights 1707b. The computing the (weighted) max-rank loss 1709a is done in block for computing (weighted) max-rank loss 1709b for each trial. All of these steps are performed in the loss rank module 324, which is situated in the SSRT module 306. Identifying the $N_{good}$ parameter values with best weighted max-rank loss, and the narrowed search interval for the ISP parameter under consideration is set to range from their minimum to their maximum in the step for calculating range modification 1711a in the block for calculating range modification 1711b. Finally determining a modified search space 1713a corresponding to the ranges for those configuration parameters is done in the block for determining a modified search space 1713b. A new low and high range, and current best values of the configuration parameters are returned in the step for returning a new low and high range, and current best values 1715a in the block for returning a new low and high range, and current best values 1715b. These steps are performed in the modify range module 326, which is situated in the SSRT module 306.

Embodiment for ISP Tuning for Object Detection

Figure 1:
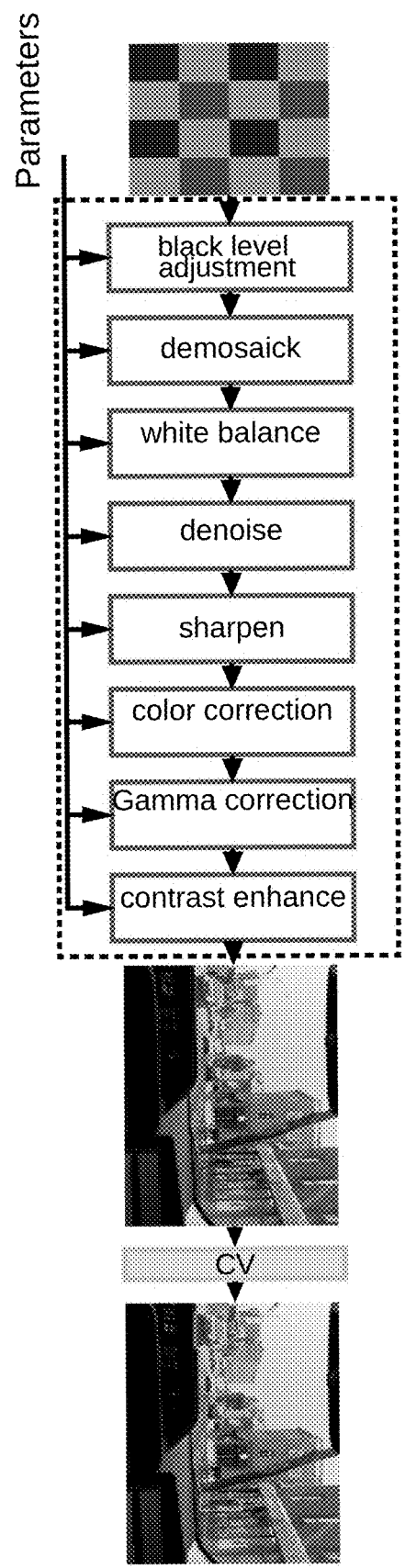
FIG. 1 illustrates a prior art ISP in vision systems designed for object detection.

Consider a traditional ISP that feeds a CV module can consist of a series of signal processing components. These components vary from one imaging system to another. However, a typical set of components common to all ISPs are black level adjustment, demosaicking, denoising, color corrections, tone mapping, etc. as shown in FIG. 1. These essential ISP components along with the parameters associated with them represent the common functionality that impacts the performance of the CV.

Figure 5:
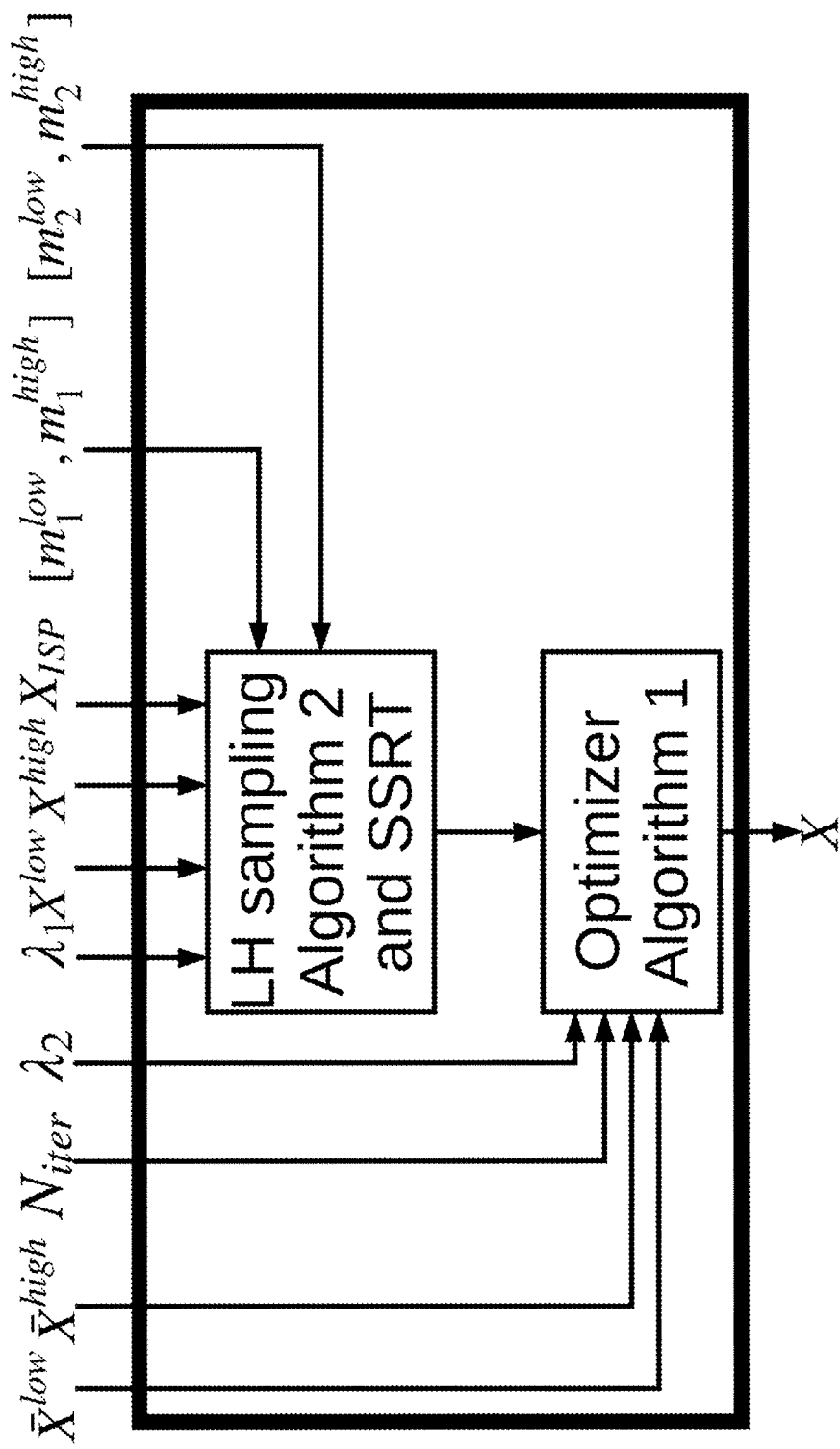
FIG. 5 illustrates a system for tuning the ISP 100 for an arbitrary object detection target task.

FIG. 5 presents the proposed ISP optimization framework set up to tune the ISP 100 for an arbitrary object detection target task.

We choose the object detection method namely Faster-RCNN (with Resnet101 backend) which is presented in "S. Ren, K. He, R. Girshick, J. Sun, Faster R-CNN: Towards real-time object detection with region proposal networks, in: Advances in neural information processing systems (NeurIPS), pp. 91-99" to detect street objects. However, any other object detection algorithm/method can be used with the proposed ISP optimization framework.

A dataset of raw images annotated with regard to street objects is created. The evaluation of this CV task typically require two KPIs. We use 2 different objectives, MAP and MAR. Refer to "T.-Y. Lin, M. Maire, S. Belongie, J. Hays, P. Perona, D. Ramanan, P. Dollar, C. L. Zitnick, Microsoft coco: Common objects in context, in: European conference on computer vision (ECCV), Springer, pp. 740-755" for the definitions of MAP (with IoU 0.5) and MAR (given 10 detections per image).

A list of different steps of the tuning process targeting Faster-RCNN object detection application is:
1. Collect a dataset of RAW images annotated with regard to street objects.
2. From the dataset a subset of images (e.g., N=100) are randomly selected as the tuning set.
3. The tuning set was provided to the optimization framework set up for the target CV task, shown in FIG. 5.
4. The output of Algorithm 1 was used as the CV-tuned parameter set.

Figure 6:
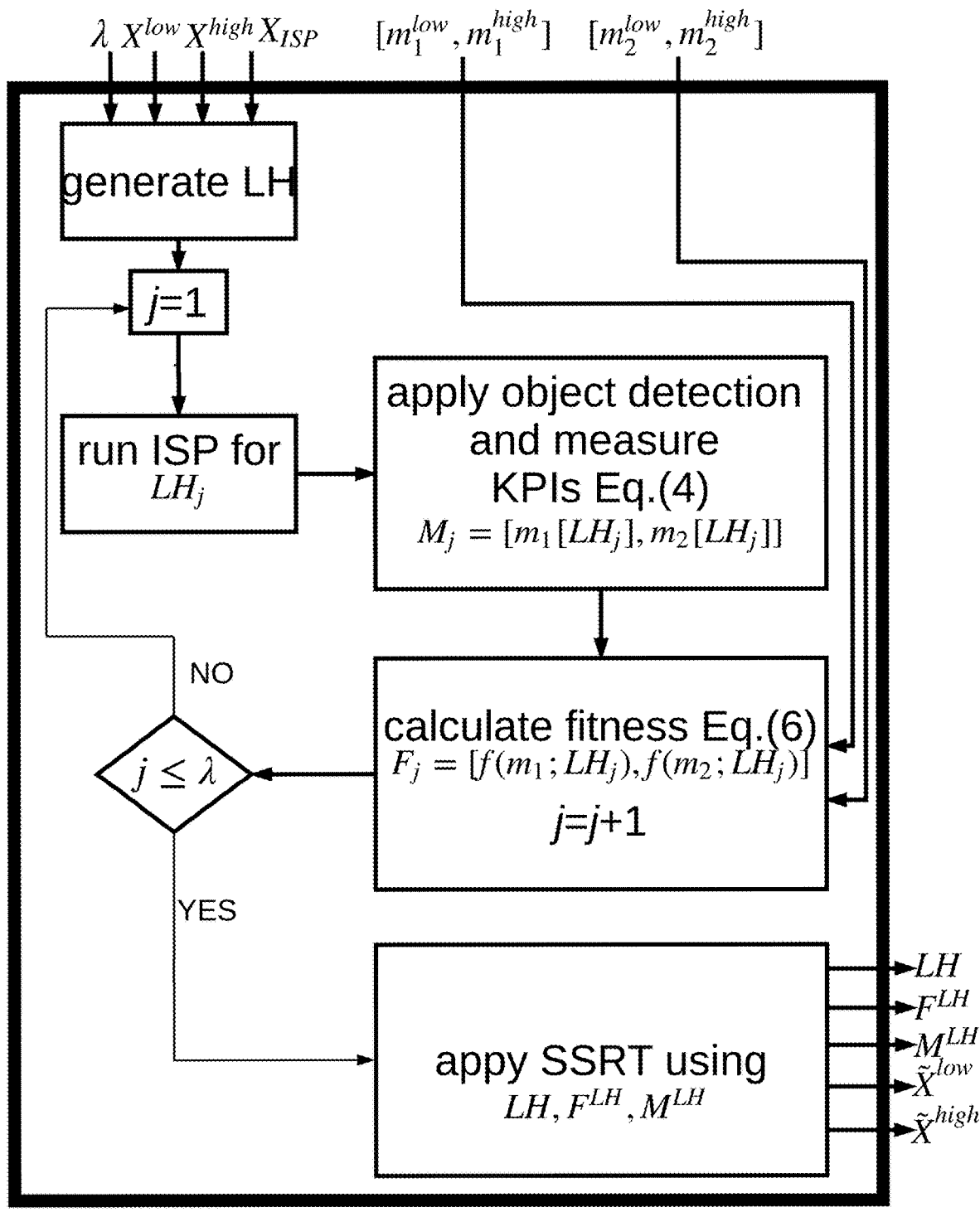
FIG. 6 illustrates the operation of the Search Space Modification Module 302 of FIG. 3.

The process of ISP tuning is done in two main steps. First, a SSRT method is applied to reduce/determine the optimization search space as shown in FIG. 6 and explained above. Then, the main optimization process shown in FIG. 7 is applied given the reduced search space.

Figure 7:
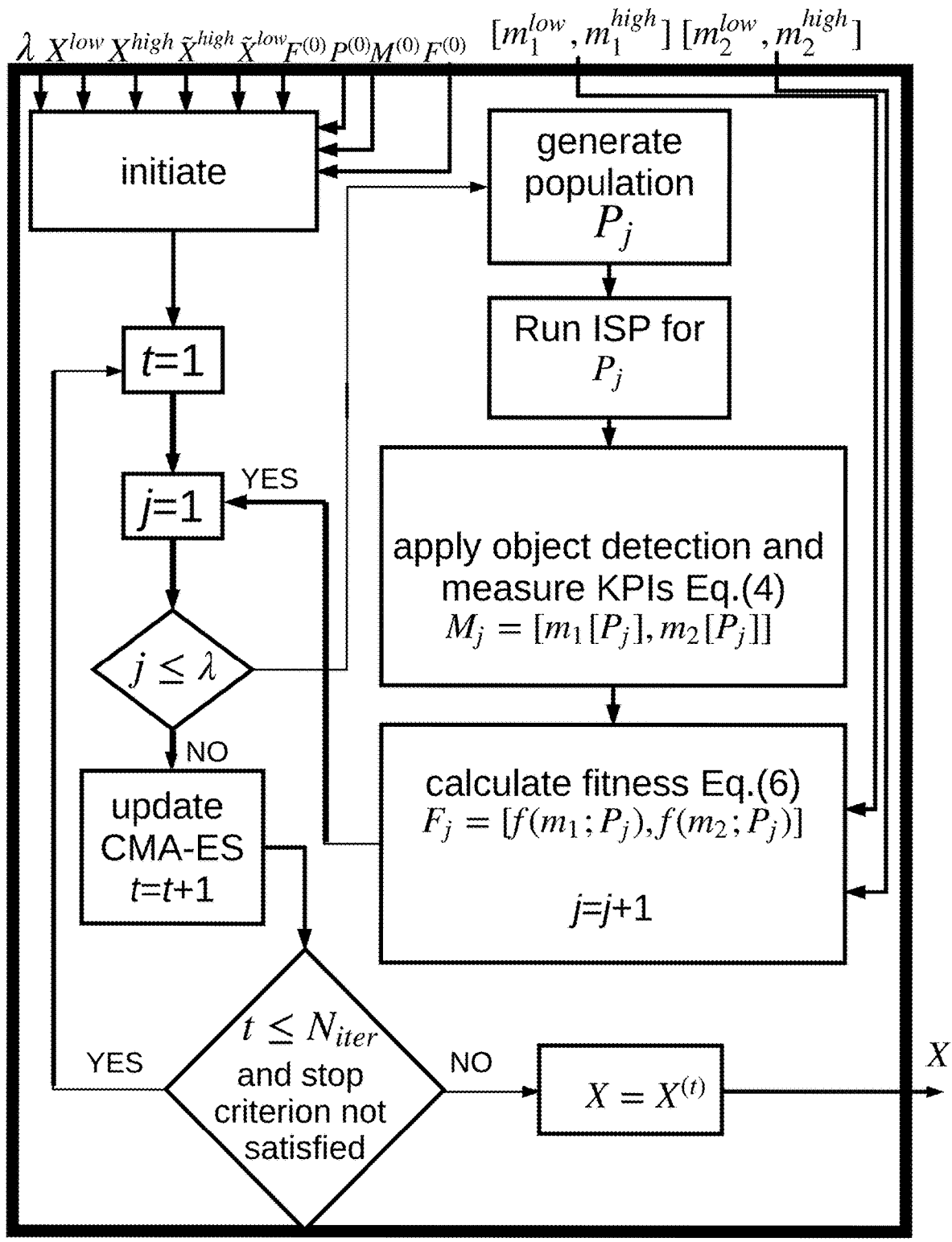
FIG. 7 illustrates the operation of the Global Optimization Module 310 of FIG. 3.

Hence, $P^{(O)}$, $F^{(O)}$, and $M^{(O)}$ in FIG. 7 are assigned with $P^{LH}$, $F^{LH}$, and $M^{LH}$ outputs of the previous step (i.e., FIG. 7), respectively.

FIGS. 8A, 8B and 8C show examples of Faster-RCNN object detection for a sample street scene for default ISP parameters, IQ-tuned parameters, and the CV-tuned parameters of the ISP respectively.

Figures 9A, 9B, 9C:
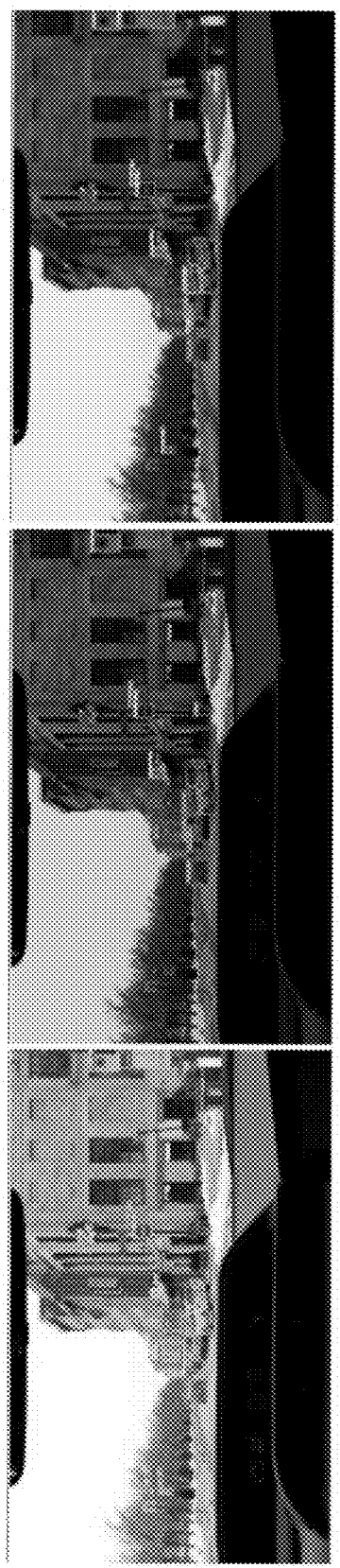
FIGS. 9A, 9B and 9C illustrate results of ISP optimization with real raw data for Faster-RCNN for day time street scene object detection, for default prior art ISP, IQ-tuned ISP, and CV-tuned ISP of the embodiment of the invention respectively.

FIGS. 9A, 9B and 9C illustrate results of ISP optimization with real raw data for Faster-RCNN for object detection of another sample street scene, for default prior art ISP, IQ-tuned ISP, and CV-tunes ISP of the embodiment of the invention respectively.

In this exemplary tuning process, we set the weights of KPIs $w_1$ and $w_2$, and their corresponding exponents $n_1$, and $n_2$ to 2. The KPI range parameters were set as $m_1^{low}=1$, $m_2^{low}=1$, $m_1^{high}=1$ and $m_2^{high}=1$.

This results in fitness Eq. (6) for $m_1$ to be $f(m_1=MAP; X)=(1-MAP(X))^2$ and for $m_2$ to be $f(m_2=MAR; X)=(1-MAR(X))^2$. This was done to equalize the effect of both MAP and MAR for tuning the ISP parameters. If for some other use-case the MAP score is preferred over the MAR score, the $w_1$ can be taken to be higher than $w_2$ and vice-versa if MAR is preferred. As both the MAP and MAR have values in similar range, the corresponding exponents are taken to be same. We empirically found $\lambda=4[(4L/3)/4]$ (i.e., 4L/3 rounded up to the nearest multiple of 4) and $\lambda$=about 128L reasonable in Algorithm 1 and Algorithm 2, respectively.

Note that the processing blocks shown in FIG. 6 and FIG. 7 are adapted to the targeted object detection task with two KPIs. However, they can be adapted to other CV applications with no further modifications, by replacing the object detection processing block with other desired ones and using the corresponding KPIs.

As a supplementary example, FIGS. 10, 11 and 12 show results of a face detection CV method applied using the default parameters, IQ-tuned parameters, and the CV-tuned parameters of the ISP where the CV-tuned parameters were obtained using the process shown in FIG. 5.

Figures 10A, 10B, 10C:
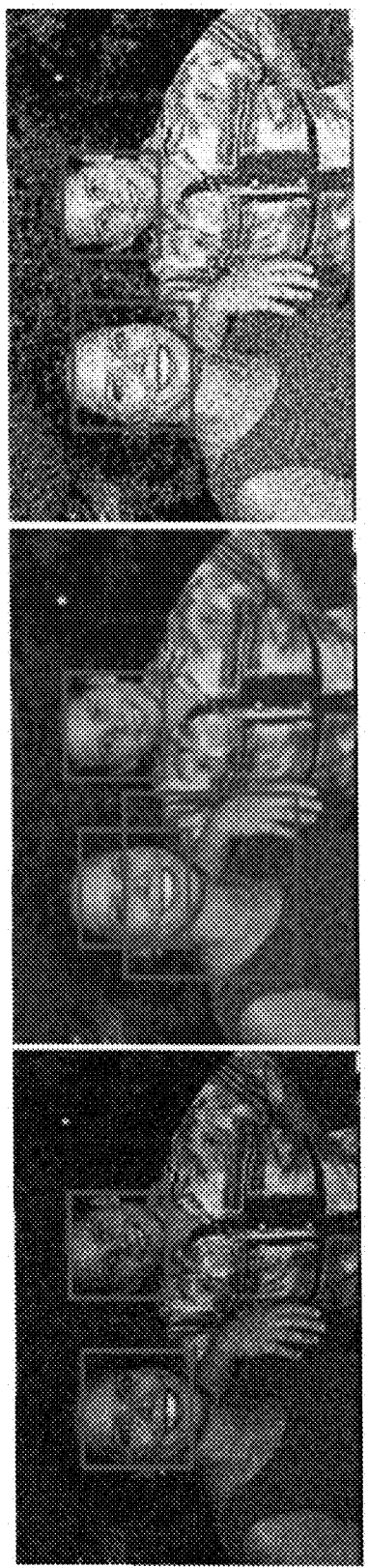
FIGS. 10A, 10B and 10C illustrate results of ISP optimization with simulated raw data for a first example of face detection, for default ISP, IQ-tuned ISP, and CV-tuned ISP of the embodiment of the invention respectively.
Figures 11A, 11B, 11C:
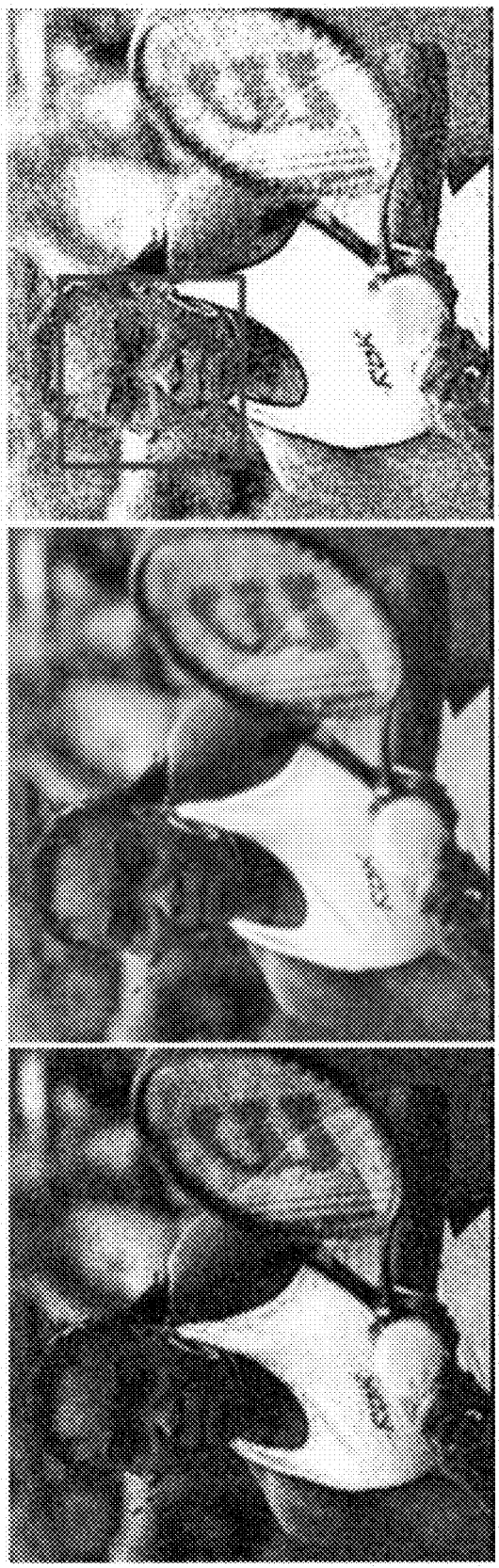
FIGS. 11A, 11B and 11C illustrate results of ISP optimization with simulated raw data for a second example of face detection, for default ISP, IQ-tuned ISP, and CV-tuned ISP of the embodiment of the invention respectively.
Figures 12A, 12B, 12C:
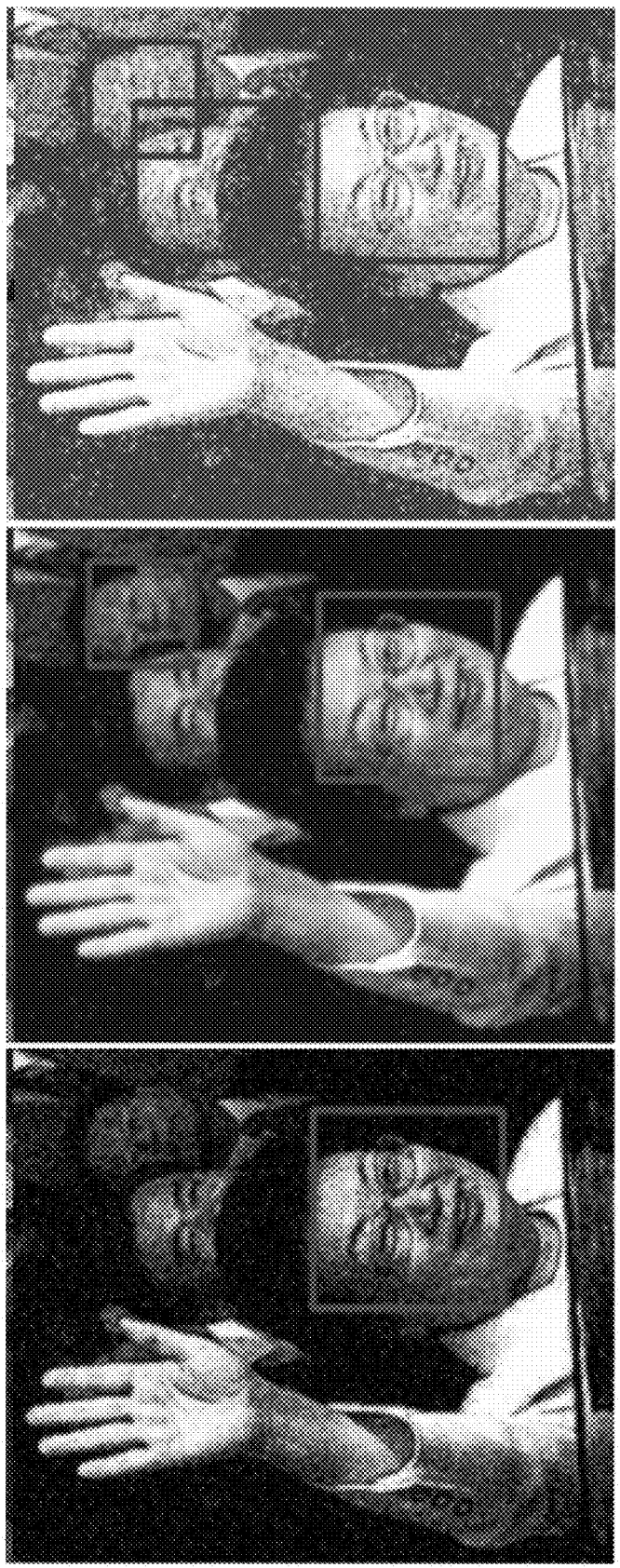
FIGS. 12A, 12B and 12C illustrate results of ISP optimization with simulated raw data for a third example of face detection, for default ISP, IQ-tuned ISP, and CV-tuned ISP of the embodiment of the invention respectively.

FIGS. 10A, 10B and 10C illustrate results of ISP optimization with simulated raw data for a first example of face detection, for default ISP, IQ-tuned ISP, and CV-tunes ISP of the embodiment of the invention respectively;

FIGS. 11A, 11B and 11C illustrate results of ISP optimization with simulated raw data for a second example of face detection, for default ISP, IQ-tuned ISP, and CV-tunes ISP of the embodiment of the invention respectively; and FIGS. 12A, 12B and 12C illustrate results of ISP optimization with simulated raw data for a third example of face detection, for default ISP, IQ-tuned ISP, and CV-tunes ISP of the embodiment of the invention respectively.

Advantages, Modifications, Variations

The use of SSRT enables the proposed system of tuning 1000 to tune all the blocks of the ISP at the same time which was not possible with the previously known ISP tuning methods. This allows for tuning to converge faster within smaller parameter ranges selected by applying SSRT on Latin-HyperCube generated samples. In the previously known automated ISP tuning methods as described in "Lin, Nishimura, Jun, et al. Automatic ISP Image Quality Tuning Using Nonlinear Optimization. IEEE International Conference on Image Processing (ICIP), 2018, pp. 2471-2475," all the ISP blocks were assumed to be independent of each other enabling them to tune each block separately. This assumption generally led to poor or slower parameter convergence.

The embodiments described above were presented targeting a specific object detection application. However, the proposed tuning framework of the present invention can be applied for any CV application including but not limited to segmentation, keypoint detection, image classification etc. by replacing the CV processing block with another suitable block. Depending on the type of CV application, a corresponding evaluation metrics can be used as the KPIs for the tuning. For example, for segmentation, a Panoptic-Quality-Metric can be used as the KPI.

The current framework/system 1000 also allows tuning the ISP 100 for multiple CV applications at the same time. This is enabled by the use of multiple metrics at the same time that can be normalized in similar range by using equations (5) described above.

We presented the embodiment as a series of optimization steps including SSRT as global optimization and CMA-ES as the local optimization. These steps can be replaced with other optimization methods, for example differential equation (DE), particle swarm optimization (PSO) etc. Depending on the complexity of the ISP optimization, steps can also include a fine tuning step like Nelder-Mead method at the end.

The presented examples described above were used to tune the ISP component of the camera. It is understood that with proper modeling of the lens and sensor component, a similar CV tuning can be also done for design and operation of the lens and sensor.

It should be noted that it is possible to by-pass the CV processing module and perform the tuning process for IQ (image quality) purposes. This can be done by removing object detection process from the processes shown in FIG. 6 and FIG. 7, and applying IQ KPIs directly on the ISP output images. More formally, IQ tuning can be done by modifying equation (4) as $$m_k[x]=KPI_k(I(X)). \qquad (9)$$

where $KPI_k$ denotes an IQ metric such as SNR, SSIM, etc. adapted to a reference image.

Thus, the proposed ISP optimization method leads to a systematic adaptation of an ISP to the desired computer vision application. Such tuned ISP parameters are produced without awareness of the specific implementation of both ISP and the computer vision module in hours (using existing off the shelf computers, for example i7-8700 used in embodiments of the invention) compared to weeks of hand tuning by ISP experts. Our experimental results show that the performance of the computer vision task may be improved by up to a factor of 2 once the ISP is tuned using the proposed optimization framework 1000 compared with the same ISP is tuned for image quality. This is achieved with only a small amount of tuning data.

Figure 13:
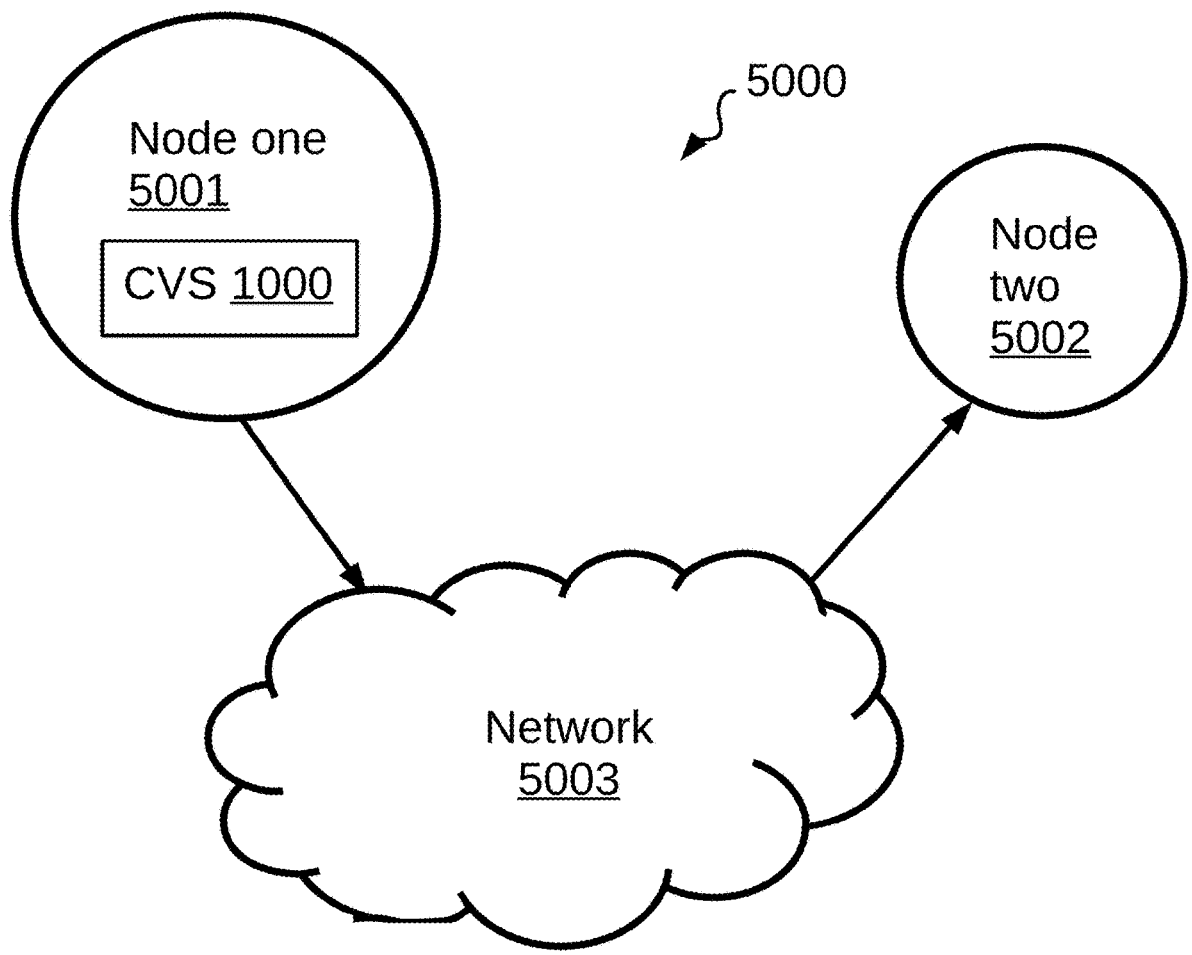
FIG. 13 shows a system 5000 comprising the network 5003.

According to yet another embodiment of the present invention, there is also provided a system 5000 having a network 5003 having one or more nodes, for example node one 5001 an node two 5002, which communicate over the network. Such a network 5003 is shown in FIG. 13, where at least one of the nodes of the network, node one 5001, comprises the computer vision system (CVS) 1000.

Methods of the embodiment of the invention may be performed using one or more hardware processors, executing processor-executable instructions causing the hardware processors to implement the processes described above. Computer executable instructions may be stored in processor-readable storage media such as floppy disks, hard disks, optical disks, Flash ROMs (read only memories), non-volatile ROM, and RAM (random access memory). A variety of processors, such as microprocessors, digital signal processors, and gate arrays, may be employed.

Systems of the embodiments of the invention may be implemented as any of a variety of suitable circuitry, such as one or more microprocessors, digital signal processors (DSPs), application-specific integrated circuits (ASICs), field programmable gate arrays (FPGAs), discrete logic, software, hardware, firmware or any combinations thereof. When modules of the systems of the embodiments of the invention are implemented partially or entirely in software, the modules contain a memory device for storing software instructions in a suitable, non-transitory computer-readable storage medium, and software instructions are executed in hardware using one or more processors to perform the methods of this disclosure.

It should be noted that methods and systems of the embodiments of the invention and data described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. An apparatus for processing image data, comprising:
at least one memory; and
at least one processor coupled to the at least one memory and configured to:
process image data to generate a first output image using a first set of configuration parameters for a computer vision operation, wherein the first set of configuration parameters are based on a first function associated with a performance of one or more computer vision systems;
output the first output image to a computer vision system for performing the computer vision operation;
process the image data to generate a second output image using a second set of configuration parameters, wherein the second set of configuration parameters are based on a second function associated with image quality, and wherein the second function is different than the first function; and
output the second output image data for visual output.

2. The apparatus of claim 1, wherein the at least one processor is an image signal processor (ISP).

3. The apparatus of claim 1, wherein the image data is raw image data from an image sensor.

4. The apparatus of claim 1, wherein the computer vision operation comprises at least one of an object detection operation, a segmentation operation, a keypoint detection operation, or an image classification operation.

5. The apparatus of claim 1, wherein the at least one processor is tuned for multiple computer vision operations based at least on the first set of configuration parameters.

6. The apparatus of claim 1, wherein the first set of configuration parameters are based on an evolutionary algorithm applied to the first function associated with the performance of the computer vision system, and wherein the second set of configuration parameters are based on the evolutionary algorithm applied to the second function associated with the image quality.

7. The apparatus of claim 6, wherein the first function associated with the performance of the computer vision system is a first multi-objective loss function, and wherein the second function associated with the image quality is a second multi-objective loss function.

8. A method for processing image data, comprising:
processing, using at least one processor, image data to generate a first output image using a first set of configuration parameters for a computer vision operation, wherein the first set of configuration parameters are based on a first function associated with a performance of one or more computer vision systems;
outputting the first output image to a computer vision system for performing the computer vision operation;
processing, using the at least one processor, the image data to generate a second output image using a second set of configuration parameters, wherein the second set of configuration parameters are based on a second function associated with image quality, wherein the second function is different than the first function; and
outputting the second output image data for visual output.

9. The method of claim 8, wherein the at least one processor is an image signal processor (ISP).

10. The method of claim 8, wherein the image data is raw image data from an image sensor.

11. The method of claim 8, wherein the computer vision operation comprises at least one of an object detection operation, a segmentation operation, a keypoint detection operation, or an image classification operation.

12. The method of claim 8, wherein the at least one processor is tuned for multiple computer vision operations based at least on the first set of configuration parameters.

13. The method of claim 8, wherein the first set of configuration parameters are based on an evolutionary algorithm applied to the first function associated with the performance of the computer vision system, and wherein the second set of configuration parameters are based on the evolutionary algorithm applied to the second function associated with the image quality.

14. The method of claim 13, wherein the first function associated with the performance of the computer vision system is a first multi-objective loss function, and wherein the second function associated with the image quality is a second multi-objective loss function.

15. The apparatus of claim 2, wherein the ISP is tuned using the first set of configuration parameters to perform the computer vision operation.

16. The apparatus of claim 15, wherein the ISP is tuned using the second set of configuration parameters to generate output images for visual output.

17. The method of claim 9, wherein the ISP is tuned using the first set of configuration parameters to perform the computer vision operation.

18. The method of claim 17, wherein the ISP is tuned using the second set of configuration parameters to generate output images for visual output.

19. The apparatus of claim 1, wherein the image data includes a first frame of image data processed to generate the first output image and a second frame of the image data processed to generate the second output image.

20. The method of claim 8, wherein the image data includes a first frame of image data processed to generate the first output image and a second frame of the image data processed to generate the second output image.

\* \* \* \* \*